US006482268B2

(12) United States Patent
Hyöky et al.

(10) Patent No.: US 6,482,268 B2
(45) Date of Patent: *Nov. 19, 2002

(54) FRACTIONATION METHOD FOR SUCROSE-CONTAINING SOLUTIONS

(75) Inventors: Göran Hyöky, Kantvik (FI); Hannu Paananen, Kantvik (FI); Kaj-Erik Montén, Lapinkylä (FI); Heikki Heikkilä, Espoo (FI); Jarmo Kuisma, Kantvik (FI)

(73) Assignee: Danisco Finland Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/745,963

(22) Filed: Dec. 22, 2000

(65) Prior Publication Data

US 2001/0001956 A1 May 31, 2001

Related U.S. Application Data

(63) Continuation of application No. 09/088,097, filed on Jun. 1, 1998, now Pat. No. 6,214,125, which is a continuation of application No. 08/486,921, filed on Jun. 7, 1995, now Pat. No. 5,795,398.

(30) Foreign Application Priority Data

Sep. 30, 1994 (FI) ................................................. 944577

(51) Int. Cl.[7] .............................. C13J 1/06; C13D 3/00; B01D 15/08; C02F 1/28; C02F 1/42

(52) U.S. Cl. ...................... 127/46.1; 127/46.2; 127/47; 127/48; 210/656; 210/660; 210/663

(58) Field of Search .............................. 127/46.1, 46.2, 127/47, 48; 210/656, 660, 663

(56) References Cited

U.S. PATENT DOCUMENTS

| 2,007,971 A | 7/1935 | Jackson | 127/58 |
| 2,375,165 A | 5/1945 | Nees et al. | 260/534 |
| 2,519,573 A | * 8/1950 | Hoglan | 260/501 |

(List continued on next page.)

FOREIGN PATENT DOCUMENTS

| CA | 754511 | 3/1967 |
| DE | 2 300 492 | 7/1973 |
| DE | 23 62 211 | 6/1975 |

(List continued on next page.)

OTHER PUBLICATIONS

Defendants' Reply in Support of Their Motion for Summary Judgment for Invalidity of the '398 Patent Under the §102(b) On Sale Bar. (Jan. 10, 2000).

(List continued on next page.)

*Primary Examiner*—Mark L. Bell
*Assistant Examiner*—Patricia L. Hailey
(74) *Attorney, Agent, or Firm*—Kenyon & Kenyon

(57) ABSTRACT

A method for separating sucrose and a second dissolved component from a sucrose-containing solution, preferably a beet-derived sucrose-containing solution, wherein the solution is subjected to a first fractionation by a continuous or sequential chromatographic simulated moving bed process to yield a sucrose-enriched fraction and a fraction enriched with the second dissolved component. The resulting fraction enriched with the second component is subjected to a second chromatographic fractionation that is a simulated moving bed or batch type process, to yield a second sucrose-enriched fraction and a second fraction enriched with the second dissolved component wherein both fractions have an improved yield or purity.

47 Claims, 8 Drawing Sheets

U.S. PATENT DOCUMENTS

| | | | |
|---|---|---|---|
| 2,524,414 A | 10/1950 | Wolfrom et al. ............... 127/55 |
| 2,586,295 A | * 2/1952 | Brown ....................... 260/501 |
| 2,588,449 A | 3/1952 | Young et al. ................. 127/30 |
| 2,818,851 A | 1/1958 | Khym et al. .................. 127/55 |
| 2,845,136 A | 7/1958 | Robinson ...................... 183/2 |
| 2,868,677 A | * 1/1959 | Kopke ........................ 127/46 |
| 2,890,972 A | 6/1959 | Wheaton ...................... 127/46 |
| 2,937,959 A | 5/1960 | Reents et al. ................. 127/46 |
| 2,949,389 A | 8/1960 | Murtaugh et al. ............. 127/36 |
| 2,985,589 A | 5/1961 | Broughton et al. ............ 210/34 |
| 3,021,374 A | 2/1962 | Radzitzky ................... 260/631 |
| 3,044,904 A | 7/1962 | Serbia ........................ 127/46 |
| 3,044,905 A | 7/1962 | Lefevre ....................... 127/46 |
| 3,044,906 A | 7/1962 | Lefevre ....................... 127/46 |
| 3,134,814 A | 5/1964 | Sargent et al. .............. 260/583 |
| 3,174,876 A | 3/1965 | Stark ......................... 127/46 |
| 3,214,293 A | 10/1965 | Mountfort ..................... 127/9 |
| 3,230,167 A | 1/1966 | Golay ......................... 210/31 |
| 3,250,058 A | 5/1966 | Baddour et al. ............... 55/67 |
| 3,268,605 A | 8/1966 | Boyd, Jr. .................... 260/666 |
| 3,298,527 A | 1/1967 | Wright ....................... 210/198 |
| 3,305,395 A | 2/1967 | Scallet et al. ................ 127/30 |
| 3,374,606 A | 3/1968 | Baddour ....................... 55/67 |
| 3,398,512 A | 8/1968 | Perkins, Jr. et al. .......... 55/386 |
| 3,407,574 A | 10/1968 | Perkins, Jr. et al. .......... 55/386 |
| 3,411,342 A | 11/1968 | Liermann ...................... 73/53 |
| 3,416,961 A | 12/1968 | Mountfort et al. ............ 127/46 |
| 3,420,709 A | 1/1969 | Barrett, Jr. et al. ........... 127/53 |
| 3,436,897 A | 4/1969 | Crowley ....................... 55/67 |
| 3,453,811 A | 7/1969 | Crowley ...................... 55/386 |
| 3,468,607 A | 9/1969 | Sloane et al. ................ 356/73 |
| 3,471,329 A | 10/1969 | Quietensky et al. .......... 127/46 |
| 3,474,908 A | 10/1969 | Catravas ..................... 210/198 |
| 3,479,248 A | 11/1969 | Nobile ........................ 162/16 |
| 3,480,665 A | 11/1969 | Nagy ....................... 260/501.3 |
| 3,483,031 A | 12/1969 | Lauer et al. .................. 127/41 |
| 3,493,497 A | 2/1970 | Pretorius et al. .............. 210/31 |
| 3,494,103 A | 2/1970 | Mir ............................ 55/67 |
| 3,494,104 A | 2/1970 | Royer ......................... 55/67 |
| 3,513,023 A | 5/1970 | Kusch et al. ................. 127/58 |
| 3,522,172 A | 7/1970 | Pretorius et al. .............. 210/31 |
| 3,539,505 A | 11/1970 | Lauer et al. ................. 210/31 |
| 3,558,725 A | 1/1971 | Kohno et al. ................ 260/635 |
| 3,579,380 A | 5/1971 | Friese ......................... 127/37 |
| 3,607,392 A | 9/1971 | Lauer et al. .................. 127/15 |
| 3,619,369 A | 11/1971 | Onishi et al. ................. 195/37 |
| 3,632,656 A | 1/1972 | Unver ..................... 260/635 R |
| 3,692,582 A | 9/1972 | Melaja ..................... 127/46 A |
| 3,694,158 A | 9/1972 | Lauer et al. ............... 23/230 R |
| 3,704,168 A | 11/1972 | Hara et al. ................... 127/58 |
| 3,706,812 A | 12/1972 | Derosset et al. ....... 260/674 SA |
| 3,730,770 A | 5/1973 | Zievers et al. ............. 127/46 B |
| 3,732,982 A | 5/1973 | Dunnill et al. ........... 210/198 C |
| 3,743,539 A | 7/1973 | Kroyer et al. ................. 127/16 |
| 3,756,855 A | 9/1973 | Duchateau et al. ............ 127/63 |
| 3,796,657 A | 3/1974 | Pretorius et al. ........... 210/31 C |
| 3,814,253 A | 6/1974 | Forsberg ..................... 210/97 |
| 3,817,787 A | 6/1974 | Hertzen et al. ............ 127/46 B |
| 3,826,905 A | 7/1974 | Valkama et al. ....... 235/151.12 |
| 3,835,043 A | 9/1974 | Geissler et al. ............ 210/31 C |
| 3,884,714 A | 5/1975 | Schneider et al. ........ 127/46 B |
| 3,928,062 A | 12/1975 | Yamauchi .................... 127/60 |
| 3,928,193 A | 12/1975 | Melaja et al. ............. 210/31 C |
| 3,959,519 A | 5/1976 | Johnson ..................... 426/648 |
| 3,982,003 A | 9/1976 | Mitchell et al. ............... 426/1 |
| 4,001,112 A | 1/1977 | Barker et al. ............. 210/31 C |
| 4,008,285 A | 2/1977 | Melaja et al. ........... 260/635 C |
| 4,075,406 A | 2/1978 | Melaja et al. ................. 536/1 |
| 4,096,036 A | 6/1978 | Liu et al. ................. 195/31 F |
| 4,143,169 A | 3/1979 | Skock et al. ................ 426/307 |
| 4,145,230 A | 3/1979 | Madsen et al. ................ 127/60 |
| 4,157,267 A | 6/1979 | Odawara et al. .......... 127/46 A |
| 4,182,633 A | 1/1980 | Ishikawa et al. .......... 127/46 A |
| 4,208,284 A | 6/1980 | Pretorius et al. .............. 210/65 |
| 4,218,438 A | 8/1980 | Callender et al. ............ 424/115 |
| 4,259,186 A | 3/1981 | Boeing et al. ........... 210/198.2 |
| 4,267,054 A | 5/1981 | Yoritomi et al. ............ 210/659 |
| 4,293,346 A | 10/1981 | Landis et al. ............. 127/46 A |
| 4,312,678 A | 1/1982 | Landis ....................... 127/46.2 |
| 4,313,015 A | 1/1982 | Broughton ................... 585/828 |
| 4,332,623 A | 6/1982 | Ando et al. ................ 127/46.2 |
| 4,359,430 A | 11/1982 | Heikkila et al. ........ 260/501.13 |
| 4,366,060 A | 12/1982 | Leiser et al. ................ 210/635 |
| 4,368,268 A | 1/1983 | Gong ......................... 435/161 |
| 4,379,751 A | 4/1983 | Yoritomi et al. ............ 210/659 |
| 4,391,649 A | 7/1983 | Shimizu et al. ............ 127/46.2 |
| 4,402,832 A | 9/1983 | Gerhold ...................... 210/659 |
| 4,404,037 A | 9/1983 | Broughton ................... 127/55 |
| 4,405,455 A | 9/1983 | Ando et al. ................. 210/191 |
| 4,412,366 A | 11/1983 | Rock et al. .................... 16/236 |
| 4,412,866 A | 11/1983 | Schoenrock et al. ....... 127/46.2 |
| 4,426,232 A | 1/1984 | Neuzil et al. ............... 127/46.3 |
| 4,451,489 A | 5/1984 | Beale et al. ................. 426/254 |
| 4,461,649 A | 7/1984 | Neuzi et al. ............... 127/46.1 |
| 4,482,761 A | 11/1984 | Chao et al. |
| 4,498,991 A | 2/1985 | Oroskar ..................... 127/46.1 |
| 4,518,436 A | 5/1985 | van der Poel ................ 127/60 |
| 4,519,845 A | 5/1985 | Ou ............................ 127/46.2 |
| 4,533,398 A | 8/1985 | Neuzil et al. ................. 127/55 |
| 4,599,115 A | 7/1986 | Ando et al. ................ 127/46.1 |
| 4,631,129 A | 12/1986 | Heikkila .................... 210/635 |
| 4,636,315 A | 1/1987 | Allen, Jr. ................... 210/656 |
| 4,666,527 A | 5/1987 | Ito et al. ...................... 127/60 |
| 4,724,006 A | 2/1988 | Day ............................. 127/30 |
| 4,732,687 A | 3/1988 | Muller et al. ............... 210/656 |
| 4,837,315 A | 6/1989 | Kukprathipanja .......... 127/46.1 |
| 4,857,642 A | 8/1989 | Kulprathipanja .......... 536/127 |
| 4,873,111 A | 10/1989 | Aaltonen et al. ............ 426/623 |
| 4,938,804 A | 7/1990 | Heikkila et al. .............. 127/60 |
| 4,938,974 A | 7/1990 | Bichsel et al. ................ 426/74 |
| 4,955,363 A | 9/1990 | Harju et al. ................ 127/46.1 |
| 4,970,002 A | 11/1990 | Ando et al. ................. 210/659 |
| 4,976,865 A | 12/1990 | Sanchez et al. ............. 210/635 |
| 4,980,277 A | 12/1990 | Junnila ......................... 435/2 |
| 4,990,259 A | 2/1991 | Kearney et al. ............. 210/659 |
| 5,032,156 A | 7/1991 | Luder et al. ................... 55/269 |
| 5,043,171 A | 8/1991 | Bichsel et al. ................ 426/74 |
| 5,081,026 A | 1/1992 | Heikkila et al. ............. 435/158 |
| 5,084,104 A | 1/1992 | Heikkila et al. ........... 127/46.2 |
| 5,102,553 A | 4/1992 | Kearney et al. ............. 210/659 |
| 5,122,275 A | 6/1992 | Rasche ....................... 210/659 |
| 5,124,133 A | 6/1992 | Schoenrock ................. 422/191 |
| 5,127,957 A | 7/1992 | Heikkila et al. |
| 5,177,008 A | 1/1993 | Kampen ..................... 435/139 |
| 5,198,120 A | 3/1993 | Masuda et al. ............. 210/659 |
| 5,382,294 A | 1/1995 | Rimedio et al. .............. 127/42 |
| 5,384,035 A | 1/1995 | Smolnik et al. ............. 210/635 |
| 5,387,347 A | 2/1995 | Rothchild ................... 127/46.1 |
| 5,482,631 A | 1/1996 | Saska et al. ................ 127/46.2 |
| 5,494,525 A | 2/1996 | Heikkila et al. .............. 127/61 |
| 5,637,225 A | 6/1997 | Heikkila et al. ............. 210/659 |
| 5,730,877 A | 3/1998 | Heikkila et al. ............. 210/659 |
| 5,770,061 A | 6/1998 | Heikkila et al. ......... 210/198.2 |
| 5,773,052 A | 6/1998 | Virtanen et al. ............... 426/2 |
| 5,795,398 A | * 8/1998 | Hyoky et al. .............. 127/46.1 |
| 5,851,405 A | 12/1998 | Paananen et al. ........... 210/724 |
| 5,858,424 A | 1/1999 | Virkki et al. .................. 426/54 |
| 5,932,016 A | 8/1999 | Paananen et al. .............. 127/48 |
| 5,980,640 A | 11/1999 | Nurmi et al. .................. 127/60 |
| 6,022,394 A | 2/2000 | Paananen et al. ............... 71/26 |
| 6,093,326 A | 7/2000 | Heikkila et al. ............. 210/659 |

| | | | |
|---|---|---|---|
| 6,187,204 B1 | 2/2001 | Heikkila et al. | 210/659 |
| 6,214,125 B1 * | 4/2001 | Hyoky et al. | 127/46.1 |
| 6,224,776 B1 | 5/2001 | Heikkila et al. | 210/659 |

FOREIGN PATENT DOCUMENTS

| | | |
|---|---|---|
| DE | 25 11 904 | 9/1976 |
| DE | 40 41 414 A1 | 6/1991 |
| EP | 0 010 769 A2 | 5/1980 |
| EP | 0 101 304 A2 | 2/1984 |
| EP | 0 279 946 A2 | 8/1988 |
| EP | 0 345 511 A3 | 12/1989 |
| EP | 0 663 224 A1 | 7/1995 |
| FI | 68526 | 10/1985 |
| FI | 75503 | 3/1988 |
| FI | 77845 | 5/1989 |
| FI | 86416 | 6/1992 |
| FI | 875655 | 6/1998 |
| GB | 715774 | 9/1954 |
| GB | 1326765 | 8/1973 |
| GB | 1 448 524 | 9/1976 |
| GB | 2 240 053 | 7/1991 |
| JP | 39-5429 | 4/1964 |
| RU | 445270 | 6/1976 |
| RU | 4614225/13 | 2/1980 |
| SA | 32855 ZA | 2/1998 |
| SU | 1072818 A | 2/1981 |
| WO | WIPO 81/00014 | 9/1981 |
| WO | WO 81/02420 | 9/1981 |
| WO | WO 81/02420 | 6/1982 |
| WO | WIPO 82/00712 | 12/1982 |
| WO | WO 91/08815 | 6/1991 |
| WO | WO 82/04265 | 12/1992 |
| WO | WO 94/17213 | 8/1994 |
| WO | WO 98/30724 | 7/1998 |
| WO | WO 98/32514 | 7/1998 |

OTHER PUBLICATIONS

Minute order and Memorandum Opinion and Order. (Mar. 28, 2001).

Plaintiff's Memorandum in Support of Motion for Reconsideration of this Court's Decision of Mar. 28, 2001 Holding the '398 Patent Invalid, or in the Alternative, to Certify the Issue for Appeal. (Apr. 27, 2001).

Plaintiff's Notice of Recent Federal Circuit Decision Relevant to Plaintiff's Motion for Reconsideration of this Court's Decision of Mar. 28, 2001. (Jul. 9, 2001).

Defendants' Response to Plaintiff's Notice of Recent Federal Circuit Decision (Jul. 13, 2001).

Plaintiff's Memorandum in Support of its Renewed Motion for Reconsideration of this Court's Decision of Mar. 28, 2001 in View of the Federal Circuit's Decision in *Group One, Ltd. v. Hallmark Cards, Inc.* 254 F.3d 1041 (Fed. Cir. 2001), or in the Alternative, to Certify the Issue for Appeal. (Aug. 10, 2001).

Plaintiff's Supplemental Memorandum in Support of its Motion for Reconsideration of this Court's Decision of Mar. 28, 2001. (Sep. 14, 2001).

Defendant's Response to Plaintiff's Supplemental Memorandum in Support of its Motion for Reconsideration (Sep. 24, 2001).

Reply Memorandum in Support of Defendants' Motion for Summary Judgment of Invalidity of the '398 Patent for Obviousness under §103 on Jan. 10, 2000.

"The Development and Application of Continuous Ion Exclusion" by Karl W.R. Schoenrock of the Amalgamated Sugar Company, presented to the 18th General Assembly, Commission International De Sucrerie, Ferrara, Jun. 8–12, 1987.

*Molasses Separation at SMSC*, Feb. 18, 1991 (F43325–F43329)(see 43328).

Cultor Travel/Meeting Report *Preliminary Cost Estimate for Crystalline Betaine Production*, by Peter Norrman, Jun. 8, 1989 (F49931–F49936).

Cultor Ltd. Finnsugar Bioproducts *Visit Report*, by Kaj–Erik Monten, Jul. 15, 1991 (F36461–F36469).

SMBSC/Cultor Joint Research Project, *Research Schedule*, for Mar.–Jun. 1993 by Goran Hyoky updated Mar. 17, 1993.

Finnsugar Report, *Betaine Separation in Renville Preliminary Investment Costs*, by Peter Norrman, Mar. 7–8, 1993 (F44079–.F44082).

Technical Report 8: *Alernative Separation Methods* by Goran Hyoky, Jan. 21, 1994.

*Some Technical and Economic Aspects of The Chromatographic Separation of Sugar Solutions* by H. Hongisto, Finnish Sugar Company Ltd. presented to British Sugar Corporation Ltd. $23^{rd}$ Technical Conference in Eastbourne, Jun. 1976.

*Large–Scale Adsorption and Chromatography*, vol. I, by Phillip C. Wankat, published by CRC Press, Inc., pp. 1–5, 1986. No month avail.

*Large–Scale Adsorption and Chromatography*, vol. II, by Phillip C. Wankat, published by CRC Press, Inc., pp. 1–113, 1986. No month avail.

Ion Exclusion Purification of Molasses by J.B. Stark, 1964. No month avail.

*Purolite Chromatographic Ion–exchange Resins* No month/date avail.

*Southern Minnesota Beet Sugar Cooperative Separation Process Training* by Goran Hyoky, Feb. 1992 (F37933–F37985).

Cultor Ltd. *Operation Manual* for the Cultor/Finnsugar Molasses, Southern Minnesota Beet Sugar Cooperative, by Goran Hyoky and Esko Varteva, Nov. 6, 1989, as revised Jul. 20, 1992, (Zitterkopf Exhibit 3) (F44355–F44397).

Cultor Ltd. *Separation Program*, One Step Separation Sequence in SMS, Two Step Separation Sequence for Western Sugar, By Jarmo Kuisma, May 25, 1993 (Hyoky Exhibit 15) (F45859–F45892).

Cultor Ltd. *Program for New Looping* by Goran Hyoky, May 8, 1992 (Hyoky Exhibit 16) (F44085–F44086).

Cultor Ltd. *Program for New Looping (Two Phase Process)* by Goran Hyoky, Jul. 8, 1992 and cover letter (Hyoky Exhibit 17) (F44273–F44274).

*Molasses and Betaine SMB Separation Daily Material Balance*, accompanied by Charts: *Betaine Separation In Renville, Preliminary Investment Cost*, by Peter Norrman of Finnsugar Ltd., Mar. 7, 1993, with cover letter of Mar. 8, 1993 (F36351–F36356 and F36360–F36363).

*Weekly Reports 1/93–49/94* by Goran Hyoky for SMBSC/Cultor Joint Research Project, Mar. 18, 1993 through Feb. 13, 1994 (Zitterkopf Exhibit 5) (F45237–F45202).

*Technical Report 4/93* by Goran Hyoky for SMBSC/Cultor Joint Research Project, Aug. 13, 1993 (F45063–F45082).

*Technical Report 5/93* by Groan Hyoky for SMBSC/Cultor Joint Research Project, Sep. 28, 1993 (F38197–F38202).

*Technical Report 6/93* by Goran Hyoky for SMBSC/Cultor Joint Research Project, Oct. 28, 1993 (F45113–F45121).

Cultor Ltd. Finnsugar Bioproducts *Trip Report* Southern Minnesota Sugar Beet Cooperative by Kaj–Erik Monten, Apr. 23, 1993 with Diagram: *Molasses and Betaine SMB Separation Daily Material Balance* And Chart: *Betaine Separation at SMSC, Renville, Preliminary Calculation* by Kaj–Erik Monten, Apr. 10, 1993 (F36339–F36347).

*Research Program* updated May 17, 1993 with Research Schedule by Goran Hyoky for SMSBC/Cultor Joint Research Project (Hyoky Exhibit No. 3) (F035514–F035521).

SMSC *Certificate of Performance* with cover letter from Kaj–Erik Monten, Jun. 14, 1993 (Monten Exhibit No. 13) (F36555–F36557).

*Sucrose Fraction Polishing* by Goran Hyoky, Jun. 28, 1993 (Hyoky Exhibit No. 4) (F38220–F38231).

Cultor Ltd. *Research Plan* for SMB Separation Test/SMSC Betaine Fraction, by J. Rinne, Nov. 15, 1993 (F035414–F035415).

Finnsugar Development *Report* for SMB Separation Test/SMBSC Betaine Fraction, by Jukka Rinne, Dec. 24, 1993 (F035391–F035395).

Finnsugar Ltd. *Report* with schematic diagram of steps used in the SMSC betaine separation of the pilot scale SMB system; Chart of No Secondary Separation; Charts with Secondary Separation; Graph of Concentration Gradient; Tables of Test Runs; and Charts with Material Balances; by Jukka Rinne, Dec. 28, 1993 (F80090–F80102).

Finnsugar *Report* with charts, graphs, and diagram of steps used with the SMSC–betaine separation on the pilot scale SMB system, by Jukka Rinne, Dec. 28, 1993 (F80103–F80164).

Joint Research Report for Southern Minnesota Beet Sugar Cooperative and Cultor/Finnsugar Bioproducts, Inc., by Goran Hyoky and Jean–Pierre Monclin, Jan. 1994 (Kuisma Exhibit No. 7) (F36617–F36646).

Defendant's Response to Finnsugar's Interrogatories Regarding The '398 Patent dated Nov. 3, 1999.

Affirmative Expert Disclosure of Dr. Michael Cleary dated Sep. 21, 1999.

Rebuttal Expert Disclosure of Dr. Michael Cleary dated Oct. 12, 1999.

Defendant ARI's Response to Finnsugar's Motion For Preliminary Injunction dated Jun. 1, 1999.

Rule 56.1(a)(3) Statement of Facts in Support of Defendants' Motion for Summary Judgment for Invalidity of the '398 Patent Under the §102(b) "On Sale" Bar dated Nov. 15, 1999.

Memorandum in Support of Defendants' Motion for Summary Judgment for Invalidity of the '398 Patent Under the §102(b) "On Sale" Bar dated Nov. 15, 1999.

Statement of Facts in Support of Defendants' Motion for Summary Judgment for Invalidity of the '398 Patent for Obviousness under §103 dated Nov. 15, 1999.

Memorandum in Support of Defendants' Motion for Summary Judgment for Invalidity of the '398 Patent for Obviousness under §103 dated Nov. 15, 1999.

Rule 56.1 (a)(3) Statement of Facts in Support of Defendants' Motion for Summary Judgment for Invalidity for Violation of §112 dated Nov. 15, 1999.

Defendants' Brief in Support of Defendants' Motion for Summary Judgment for Invalidity for Violation of §112 dated Nov. 15, 1999.

* *"Proceedings Of The Research Society Of Japan Sugar Refineries' Technologists"*, edited by The Research Institute Of The Japan Sugar Refiners' Association, vol. 27, Aug., 1977.

* *"Purification Of Sugar Products By The Ion Exclusion Process"* by D. Gross of Tate & Lyle, Ltd., Research Centre, Keston, Kent, England; presented to the $14^{the}$ General Assembly, C.I.T.S, Brussels, 1971. No month avail.

*Processing Equipment: *"High–volume chromatography separates the 'hard to separate' organic Compounds"*, Food Engineering, May, 1983.

*"Simultaneously Continuous Separation of Glucose, Maltose, and Maltotriose Using a Simulated Moving–Bed Adsorber"* by Kyu Beom Kim, Shiro Kishihara, and Satoshi Fujii of The Graduate School of Science and Technology, Kobe University, I, Rokkadai, Nada–ku, Kobe 657, Japan Received Sep. 2, 1991.

*Chromatographic Separation: *"A Sequential Chromatographic Process for the Separation of Glucose/Fructose Mixtures"*, by P. E. Barker, C. H. Chuah of the Chemical Engineering Department, University of Aston in Birmingham, Gosta Green, Birmingham, *The Chemical Engineer*, (Aug./Sep. 1981), pp. 389–393.

* *"On The Utilization Of Betaine From Sugar Beets"* by J.P. Dubois, Raffinerie Tirlementoise, s.a., D–3300 Tienan (Belgium). No month /date avail.

S.I.T. Paper #649: *"An Audubon Sugar Institute–Applexion Process For Desugarization Of Cane Molasses"*, by M. Saska, Ch. Pelletan, Mei Di Wu and X. Lancrenon, presented at the 1993 Sugar Industry Technologists Meeting, Jun. 13–16, 1993, Toronto Ontario.

S.I.T. Paper #428: *"Liquid Sugar From The Chromatographic Molasses Desugarization Process"* by H. J. Hongisto, Finnish Sugar Co., Ltd., Kantvik, Finland, vol. XXXVIII, Publication of Technical Papers and Proceedings of the $38^{th}$ Annual Meeting of Sugar Industry Technologists, Inc, Boston, Massachusetts, May 6–9, 1979.

*"Desugarisation of Cane Molasses By the Finnsugar Chromatographic Separation Process"*, By H. Hongisto and H. Heikkila, reprint ISSCT (1977). No month avail.

*"Beet Sugar"* by Michael Cleary of Imperial Holly Corporation appearing in Kurk–Othmer, *Encyclopedia Of Chemical Technology*, Fourth Edition, vol. 23, published by John Wiley & Sons, Wiley–Interscience (1977). No month avail.

Process Technology: *"Separating Sugars And Amino Acids With Chromatography"*, by Heikki Heikkila, Finnish Sugar Co., Ltd., *Chemical Engineering* Jan. 24, 1983, pp. 50–52.

*"Trends In The Chromatographic Separation Of Molasses"*, by Hannu A. Paananen, *Zuckerind 122* (1997) Nr. 1, pp. 28–33. No month avail.

*"Engineering Analysis Of Ion Exclusion For Sucrose Recovery from Beet Molasses, Part I Experimental Procedures And Data Reduction Techniques"* by W.G. Schultz, J. B. Stark and E. Lowe, Western Regional Research Laboratory, Western Utilization Research And Development Division, Agricultural Research Service, U.S. Department of Agriculture, Albany, California, 94710 U.S.A., published in the *International Sugar Journal*, Feb., 1967.

"Engineering Analysis Of Ion Exclusion For Sucrose Recovery From Beet Molasses, Part II Data Analysis And Cost Projection" by W.G. Schultz, J. B. Stark and E. Lowe, Western Regional Research Laboratory, Western Utilization Research And Development Division, Agricultural Research Service, U.S. Department of Agriculture, Albany, California, 94710 U.S.A., published by the *International Sugar Journal*, Apr., 1967.

S.I.T. Paper 373: "The Recovery Of Sugar From Beet Molasses By Ion Exclusion", by James F. Zieverz and C. J. Novotny, Industrial Filter & Pump Mfg. Co., Cicero, Illinois. No month/date avail.

"Recovery Of Sugar From Beet Molasses" By The P. & L. Exclusion Process, by H. G. Schneider and J. Mikule of Pfeifer & Langen, Euskirchen, Germany, published in the *International Sugar Journal*, Part I, pp. 259–264, Sep. 1975.

"Recovery of Sugar From Beet Molasses by The P. & L. Exclusion Process", by H.G. Schneider and J. Mikulse of Pfeifer & Langen, Euskirchen, Germany, published in the *International Sugar Journal*, Part II, pp. 294–298, Oct., 1975.

Chromatographic Separation of Sugar Solutions: "The Finnsugar Molasses Desugarization Process", Part II, by H. J. Hongisto, Technical Department, Finnish Sugar Company, Ltd., Kantvik, Finland, published by the *International Sugar Journal*, May 1977, pp. 132–134.

"Trends In The Chromatographic Separation Of Molasses", by Hannu A. Paananen of Cultor Ltd., Finnsugar Bioproducts, Helsinki, Finland, Proceedings of the Workshop on Separation Process in the Sugar Industry, New Orleans, Apr., 1996, pp. 100–119.

Ari: "Coupled Loop Chromatography" by Mike Kearney of Amalgamated Research, Inc., Presented at the 29$^{th}$ General Meeting, American Society of Beet Sugar Technologists, Mar. 1977.

"Simulated Moving–Bed Technology In The Sweetener Industry", by D. Eugene Rearick, Michael Kearney, and Dennis D. Costesso of Amalgameted Research, Inc., published in *Chemtech*, vol. 27, No. 9, pp. 36–40. No month/date avail.

"Desugarisation Of Beet Molasses By the Finnsugar Chromatographic Separation Process", by H. Hongisto, Finnsugar Engineering. No month/date avail.

SPRI: "Trends In The Chromatographic Separation of Molasses", by Hannu A. Paananen of Cultor, Ltd., Finnsugar Bioproducts, Helsinki, Finland, presented at the Proceedings of the 1996 Workshop on Separation Process in the Sugar Industry. No month avail.

"The Recovery Of Sugar From Beet Molasses By the P. & L. Exclusion–Process", by H. G. Schneider and J. Mikule of Pfeifen & Lange, Euskirchen, Germany. No month/date avail.

"Engineered Fractal Cascades For Fluid Control Applications" by Mike Kearney of Amalgamated Research, Inc. Twin Falls, Idaho. No month/date avail.

"Control Of Fluid Dynamics With Engineered Fractal Cascades–Adsorption Process Applications", by Mike Kearney, Director, New Technology, Amalgamated Research Inc., Twin Falls Idaho 1997. No month avail.

"Molasses Exhaustion Session", Keynote Speech Summary, by Mike Kearney, Director, New Technology, Amalgamated Research Inc., published by *British Sugar EuroTechLink 97, England*. No month/date avail.

"Multicomponent Separation Using Simulated Moving Bed Chromatography", by V. Kochergin and M. Kearney of Amalgamated Research, Inc., presented at AIChE Annual Meeting, Los Angeles, Nov. 16–21, 1997, Novel Adsorption–Based Separation Equipment Configuration, AIChE Proceedings, Part 2, pp. 1539–1544.

"Molassesdesugarization with Liquid Distribution Chromatography", by Dr. Mohammad Munir, Zentral–Laboratorium dor Suddautschen Zucker–Aktiengesollschaft, presented at 15$^{th}$ General Assembly of Commission Internationale Technique de Sucrerie, Vienna, Austria, May 12–16, 1975.

"Ion Exclusion . . . an overlooked ally", by James F. Zievers, C. J. Novotny, and E. A. Selvick of Industrial Filter and Pump Mfg. Co., Cicero, Illinois, published in *The Sugar Journal*, Feb., 1972, pp. 7–10.

"Ion Exchange For Desugaring Of Molasses And Byproduct Isolation", by L.H. Ramm–Schmidt, published by B.V. Amsterdam, 1988, printed in Netherlands, pp. 111–126. No month avail.

"Application Of The Finnsugar–Pfeifer & Langen Molasses Desugarisation Process In A Beet Sugar Factory", by H. J. Hongisto and P. Laakso. No month/date avail.

"The Removal Of Color From Sugar Solutions By Adsorbent Resins", by R. I. M. Abrams, Technical manager of Duplite Ion Exchange Resins, Diamond Shamrock Chemical Company, Redwood City, California, published in *Sugar y Azuca*, 1971, pp. 31–34. No month avail.

"Simulated Moving Bed Technology Applied To The Chromatographic Recovery Of Sucrose From Sucrose Syrups", by Mike Kearney of The Amalgamated Sugar Company, Twin Falls, Idaho, presented at Conference on Sugar Processing Research, Fiftieth Anniversary Conference, San Francisco, California, May 29–Jun. 1, 1990.

Ion Exchange An Overlooked Ally: "Ion Exclusion Experiments", by James F. Zievers, C. J. Novotny, and E. A. Selvick of Industrial Filter and Pump Mfg. Co., Cicero, Illinois, Oct. 4, 1970, pp. 12–24.

"Separation Process in the Sugar Industry". Proceedings of S.P.R.I. Workshop on Separation Processes in the Sugar Industry, Edited by Margaret A. Clarke. Sugar Processing Research Institute Inc., New Orleans, LA Oct., 1996.

"New Development In The Chromatographic Desugarisation Of Beet Molasses", by Francois Rouseet, Applexion, France, published by British Sugar EuroTechLink 97, York England. No month/date avail.

"Chromatographic Separation Of Sugar Solutions The Finnsugar Molasses Desugarization Process", by H. J. Hongisto, Technical Department, Finnish Sugar Company, Ltd., Kantvik, Finland, presented to the 23$^{rd}$ Tech. Conf., British Sugar Corp. Ltd, 1976, Part I published in *International Sugar Journal*, Apr. 1977, pp. 100–104.

"Chromatographic Separation Of Sugar Solutions the Finnsugar Molasses Desugarization Process", by H. J. Hongisto, Technical Department, Finnish Sugar Company, Ltd., Kantvik, Finland, presented to the 23$^{rd}$ Tech. Conf., British Sugar Corp. Ltd, 1976, Part II published in *International Sugar Journal*, May 1977, pp. 131–134.

"Ion Exclusion Purification Of Sugar Juices", by Lloyd Norman, Guy Rorabaugh, and Harold Keller, Research Laboratory Manger and General Chemist, Director of Research, Holly Sugar Corporation and Assistant Director, Illinois Water Treatment Company, published by *Journal of A. S. S. B. T.*, vol. 12, No. 5, Apr., 1963, pp. 362–370.

"Chemical Educators Stress Industry Ties" by Ward Worthy and Richard J. Seltzer of C&EN Washington, published Oct. 6, 1975, *C&EN*.

"Adsorption Separates Xylenes" by Seiya Otani of Toray Industries, Inc., published by *Chemical Engineering*, Sep. 17, 1973.

"Designing Large–Scale Adsorptive Separations" by E.N. Lightfoot, S.J. Gibbs, A.M. Athalye and T.H. Scholten of Department of Chemical Engineering, University of Wisconsin, Madison, WI., published *Israel Journal of Chemistry*, vol. 30, 1990, pp. 229–237. No month avail.

"Continuous Chromatographic Separation Of Fructose/Glucose" by Tetsuya Hirota of Mitsubishi Chemical Industries, Ltd., published *Sugar y Azucar* Jan. 1980.

"Mechanism Of The Separation Of Glucose And Fructose On A Strong–Acid Cation Exchanger" by Charles A. Sauer of Applications Development, Duolite International, Inc., a subsidiary of Diamond Shamrock Corporation, Apr. 23, 1981.

"High Purity Fructose Via Continuous Adsorptive Separation" by D.B. Broughton, H.J. Bieser, R.C. Berg, E.D. Connell, D.J. Korous, and R.W. Neuzil of UOP, Inc., published *La Sucrerie Belge*, vol. 96—May 1977, pp. 155–162.

"Large–Scale Chromatography: New Separation Tool" by R.S. Timmins, L Mir, and J.M. Ryan of Abcor, Inc., published by *Chemical Engineering*, May 19, 1969, pp. 170–178.

"The Tasco Chromatographic Separator At Twin Falls Factory" by K. P. Chertudi of The Amalgamated Sugar Company, published by *International Sugar Journal*, 1991, vol. 93, No. 1106. No month avail.

"The Amalgamated Sugar Company Raw Juice Chromatographic Separation Process" by Mike Kearney and D. Eugene Rearick of The Amalgamated Sugar Company Research Laboratory, Twin Falls, Idaho, presented at 1995 C.I.T.S. 20th General Assembly, Munich, Germany, Jun., 1995.

* *"Production Of Raffinose: A New By–Product Of the Beet Sugar Industry"* by K. Sayama, T. Kamada, and S. Oikawa of Nippon Beet Sugar Mfg Co Ltd., Japan, presented at British Sugar plc Technical Conference Eastbourne, 1992. No month avail.

*"Contribution To The Biochemistry And Use Of The Beet Constituent Betaine.," Von W. Steinmetzer 25 (1972) Nr. 2, pp. 48–57. Month N/A.

*Finnsugar Bioproducts, Inc. v. The Amalgamated Sugar Company, LLC*, et al., Civial Action No. 97–C–8746 (N.D. Ill.)—Answer and Counterclaims to the Amended and Supplemental Complaint of the Amalgamated Sugar Company, LLC and Amalgamated Research, Inc. No month/date avail.

* cited by examiner

FRACTIONATION METHOD FOR SUCROSE-CONTAINING SOLUTIONS

This application is a continuation of prior application Ser. No. 09/088,097, filed Jun. 1, 1998, now U.S. Pat. No. 6,214,125, which is a continuation of Ser. No. 08/486,921, filed Jun. 7, 1995, now U.S. Pat. No. 5,795,398.

FIELD OF INVENTION

The present invention relates to a method for separating sucrose and, optionally, a second dissolved component from solution. More particularly, the invention relates to a method in which a solution containing sucrose and other dissolved substances is first fractionated by a chromatographic simulated moving bed (SMB) process to yield a sucrose-enriched fraction and, optionally, a separate fraction enriched with a second component to be recovered. When two separate fractions are produced, the latter fraction is further fractionated chromatographically, either by a batch method or a simulated moving bed method. In a preferred embodiment, a beet-derived sucrose-containing solution is fractionated to yield a sucrose-enriched fraction and a fraction enriched with a second organic compound commonly present in beet-derived solutions, such as betaine, inositol, raffinose, galactinol, or serine and other amino acids.

BACKGROUND OF THE INVENTION

It is known that sucrose and betaine are recoverable from molasses by chromatographic separation. U.S. Pat. No. 4,359,430 to Suomen Sokeri Oy, describes a chromatographic method for the recovery of betaine from molasses by a batch process in which diluted molasses is fractionated with a polystyrene sulphonate cation exchange resin in alkali metal form. This method achieves good separation of sucrose and betaine. This reference also discloses a method in which a betaine-enriched fraction obtained from a first fractionation is subjected to further chromatographic purification. The further purification step is said to be capable of separating other components from the betaine-enriched fraction. However, the dry solids content in the sucrose and betaine fractions obtained by this method is relatively low, therefore, large amounts of eluant water must be evaporated when recovering the sucrose and betaine from the respective fractions by crystallization.

Continuously operated chromatographic separation processes presently employ the SMB method, which method is used in a variety of different applications. The SMB method has a separating performance that is several times higher than that of the batch method, and also results in significantly lower dilution of the products or, conversely, lower consumption of eluant.

The SMB method may be carried out in either a continuous or a sequential mode. In both processes, the pattern of fluid streams is the same. These streams are (1) the supply of feed solution and eluant to the bed or beds, (2) the recycling of the liquid mixture between beds, and (3) the withdrawal of products from the beds. The flow rate for these flows may be adjusted in accordance with the separation goals, i.e., increased yield, purity, or capacity. In a continuous SMB process, which was first disclosed in the early 1960s in U.S. Pat. No. 2,985,589, all fluid streams flow continuously. Separation of sucrose by such continuous SMB methods has been described in international publication no. WO 91/08815 by the Amalgamated Sugar Company and in U.S. Pat. No. 4,990,259 to M. Kearney and M. Mumm and assigned to The Amalgamated Sugar Company.

In a sequential SMB process, some of the fluid streams do not flow continuously. Sequential SMB fractionation methods in which a sucrose fraction and a betaine fraction are recovered from beet molasses are disclosed in Finnish Patent 86,416 to Suomen Sokeri Oy, which corresponds to U.S. Pat. No. 5,127,957 and international publication no. WO 94/17213 to Suomen Sokeri Oy. German Offenlegungsschrift 4,041,414 to Japan Organo Co., which corresponds to British published application 2,240,053, also discloses a sequential SMB fractionation by the "KAAK method" (which refers to cation exchange—anion exchange—anion exchange—cation exchange as described in Sayama, K., Kamada, T., and Oikawa, S., Production of Raffinose: A New By-Product of the Beet Sugar Industry, British Sugar plc, Technical Conference, Eastbourne 1992). Molasses produced by such a beet sugar process has a different composition from common molasses. Typically, beet molasses contains 1.5–3.5% by weight of raffinose and 3.5–6.5 weight % of betaine on a dry solids basis. Since the feed solution of Example 3 in German Offenlegungsschrift 4,041,414 has a raffinose content of 17.3% by weight and a betaine content of 12.2% by weight on a dry solids basis, it can be concluded, on the basis of the raffinose-to-betaine ratio, that roughly half of the betaine contained in common beet molasses was lost in the ion exchange treatment.

According to Finnish Patent 86,416, a purity as high as 70.9% d.s. for the betaine fraction was obtained, with 11.1% d.s. of sucrose present in the betaine-enriched fraction. However, the 86.8% purity of the sucrose fraction does not meet the requirements of the sugar industry. Similarly, the 47.5% purity of the betaine fraction reported in international publication no. WO 94/17213 is rather poor.

OBJECT AND SUMMARY OF THE INVENTION

It is an object of the present invention to fractionate sucrose and a second desired organic component, such as betaine, inositol, raffinose, galactinol, serine, or other amino acids, from a solution so as to obtain higher yields with at least equivalent purity for sucrose.

It is also an object of the present invention to fractionate sucrose and betaine from a beet-derived sucrose-containing solution with a higher purity and a higher yield for betaine.

It is a further object of the present invention to provide an economical fractionation method, in terms of capacity and the eluant/feed ratio, that separates two components from a sucrose-containing solution with high yield and high purity as economically as the prior SMB methods for fractionating sucrose-containing solutions.

Accordingly, the present invention is a method for separating sucrose and, optionally, a second dissolved component from a sucrose-containing solution, preferably a beet-derived sucrose-containing solution, in which the solution is subjected to a first chromatographic fractionation by a SMB method to yield a sucrose-enriched fraction (hereinafter the first sucrose fraction) and a fraction enriched with the second dissolved component, and the resulting fraction enriched with the second component is subjected to a second chromatographic fractionation, to yield a second sucrose-enriched fraction (hereinafter the second fraction) and a second fraction enriched with the second dissolved component. The first fractionation may be carried out so that sucrose and the second dissolved component are enriched in the same fraction, or preferably, they are enriched in separate fractions.

DETAILED DESCRIPTION OF THE INVENTION

Figure 1:
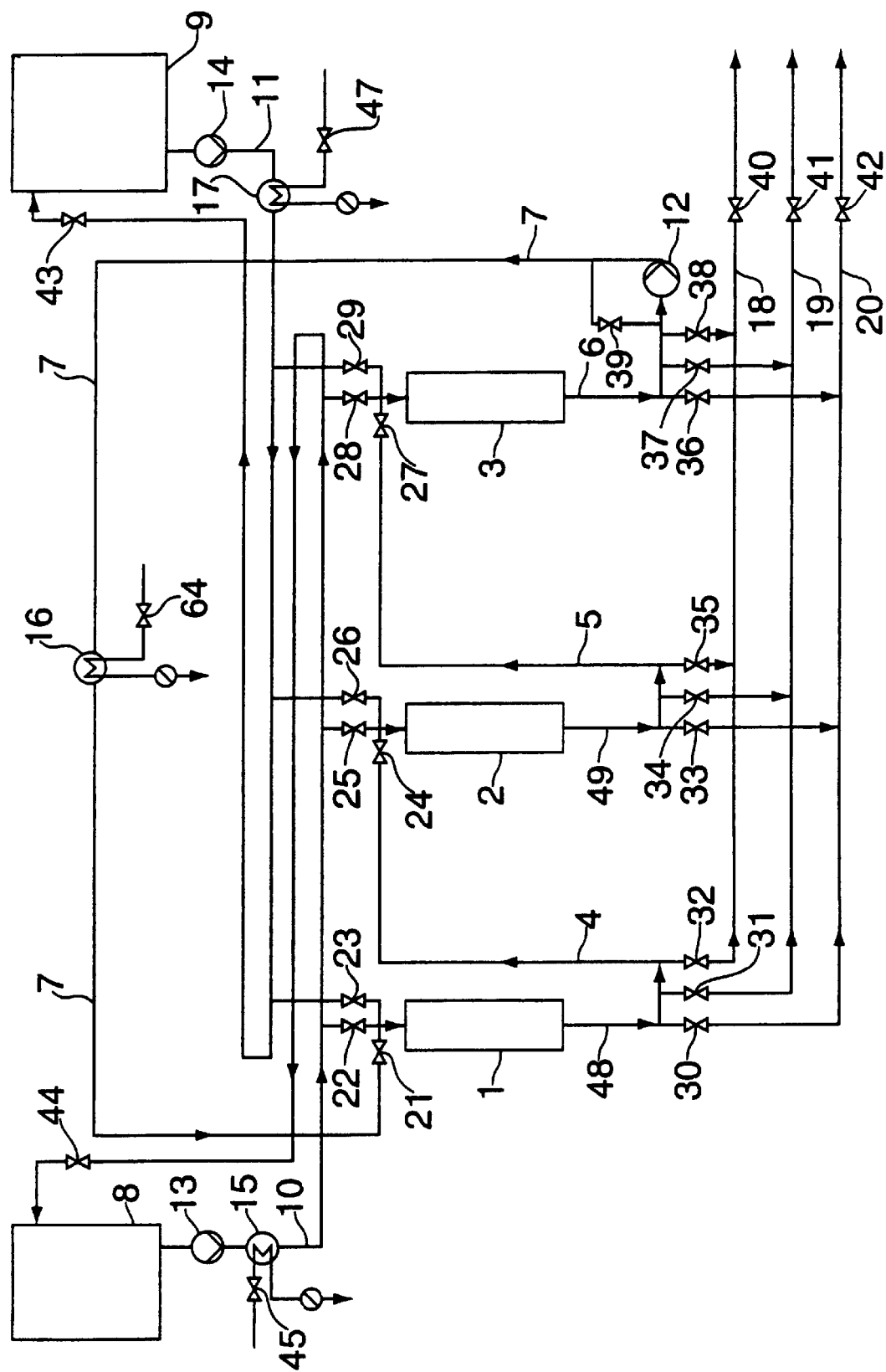
FIG. 1 is a schematic diagram of a three-column sequential SMB process as described in Example 1 for separating sucrose and betaine from molasses.

The present invention is directed to a method for separating sucrose and, optionally, a second dissolved component from a sucrose-containing solution. The solution is subjected to chromatographic fractionation by a continuous or sequential SMB method where the two components are enriched in the same fraction or in separate fractions and either the single fraction or the second fraction is subjected to a second chromatographic fractionation in order to recover sucrose and a second component with an improved yield or purity.

In accordance with a preferred embodiment of the invention, the second sucrose fraction is combined with the sucrose fraction from the first chromatographic fractionation, and sucrose is recovered from the combined sucrose fraction thus obtained.

In accordance with another preferred embodiment of the invention, the second sucrose fraction is returned to the feed solution for the first fractionation. In this embodiment, sucrose is recovered from the first sucrose fraction.

Generally, the second dissolved component is recovered from the fraction obtained from the second fractionation, which is enriched with the second dissolved component. The term "second dissolved component" refers to organic compounds commonly present in beet-derived solutions, such as betaine, inositol, raffinose, galactinol, or serine and other amino acids. The second chromatographic fractionation, i.e., fractionation of the fraction enriched with the second dissolved component which is obtained from the first fractionation, may be performed either by a batch method or a SMB method.

The invention is particularly suitable for the recovery of sucrose and betaine from beet molasses. Therefore, the following description of the invention specifically refers to the recovery of sucrose and betaine, but the invention is not so limited. Instead of, or in addition to betaine, any other dissolved organic substance may be similarly recovered by adjusting the process conditions and parameters to suit the separation in question, which can be achieved easily by those skilled in the art.

With the method of the invention, the sucrose yield can be improved by up to about 10 percent compared with the SMB processes presently employed in the sugar industry. This improvement represents remarkable economic advantages in view of the large amount of the molasses used by the sugar industry for chromatographic separation. For example, in the United States, about 500,000 tons d.s. of molasses are currently used per annum.

The purity of the sucrose fraction produced by the method of the invention meets or exceeds the goal of about 92% set for industrial SMB methods.

With regard to betaine, the method of the invention can achieve yields as high as about 95%, which is a significant advantage over prior yields of about 30–70%, and a purity as high as about 95%, calculated on a dry solids basis, which is a substantial increase over purities of about 25–70% hitherto obtained.

The first chromatographic separation in the method of the invention may be carried out with prior art SMB methods and apparatus known to be suitable for the fractionation of molasses, such as those disclosed in U.S. Pat. No. 4,402,832 (continuous SMB method), Finnish Patent 86,416, and international publication no. WO 94/17213 (discussed above).

Also, the further fractionation of the betaine fraction produced in the first fractionation to yield a second sucrose fraction and a second betaine fraction may be carried out by known chromatographic separation methods and apparatus, such as the methods and apparatus disclosed in U.S. Pat. No. 4,359,430 (batch method), and Finnish Patent 86,416 and international publication no. WO 94/17213 (SMB methods).

In the continuous SMB method, all flows (supply of feed solution and eluant, recycling of liquid mixture, and withdrawal of product fractions) are typically continuous. The rates for these flows may be adjusted in accordance with the separation goals, namely, yield, purity, and capacity. There are normally 8 to 20 packed beds that are combined into a single continuous loop. The feed and product withdrawal points are shifted cyclically in the downstream direction in the packed bed. Due to the supply of eluant and feed solution, the withdrawal of products, and the flow through the packed bed, a dry solids profile is formed in the packed bed. Constituents having a relatively low migration rate in the packed bed are concentrated in the back slope of the dry solids profile, while ingredients having a higher migration rate are concentrated in the front slope. The points of introduction of the feed solution and eluant and the withdrawal points of the product or products are shifted gradually at substantially the same rate at which the dry solids profile moves in the packed bed. The product or products are withdrawn substantially from the front and back slopes of the dry solids profile. The feed solution is introduced substantially at the point where the composition of the cyclically moving dry solids profile is closest to the composition of the feed solution, and the eluant is introduced approximately at the point of minimum concentration of the dry solids profile. Part of the separated products are recycled due to the continuous cyclic flow, and only part of the dry solids is withdrawn from the packed bed during one sequence.

The feed and withdrawal points are shifted cyclically by using feed and product valves located along the packed bed, typically at the upstream and downstream end of each section of the packed bed. (The requisite valves and feed and withdrawal equipment are part of the apparatus). If product fractions of very high purity are desired, short phase times and multiple sections of packed beds must be employed.

In the sequential SMB system, not all flows (supply of feed solution and eluant, recycling of liquid mixture, and withdrawal of products) are continuous. Yet the shifting of the dry solids profile or profiles moving cyclically in the system is continuous. The flow rate and the volumes of the different feeds and product fractions may be adjusted in accordance with the separation goals, i.e., yield, purity and capacity.

During the feeding phase, a feed solution, and, optionally, also an eluant during a simultaneous eluting phase, is introduced into predetermined packed beds, and, simultaneously, one or more product fractions are withdrawn. During the eluting phase, eluant is introduced into a predetermined packed bed or beds and, during the feeding and eluting phases, one or more product fractions are withdrawn.

During the recycling phase, essentially no feed solution or eluant is supplied to the packed beds and no products are withdrawn. A forward flow is maintained in a fixed direction in a system comprising at least two columns, and the products are recovered during a multi-step sequence comprising the above phases. One column may equal a single packed bed or a portion of a packed bed. In the latter configuration, the columns that make up a packed bed are referred to as "sectional packed beds."

During the feeding phase, feed solution is introduced into a column and a corresponding quantity of any product fraction is withdrawn at a point which may be located either in the same column as the feed point (in which case the other columns in the system may be, for example, in the eluting or recycling phase) or in a different column from that of the feed point, which column is connected in series (optionally through other columns) with the column into which the feed is introduced. During the recycling phase, the liquid in the columns, along with its dry solids profile or profiles, is recycled in a loop comprising one, two or several columns. In the eluting phase, eluant is introduced into the column and a corresponding amount of product fraction(s) is (are) withdrawn from the same or a downstream column.

As stated previously, a detailed description of these sequential SMB processes applied to the recovery of sucrose and betaine from beet molasses is provided in Finnish Patent 86,416 and international publication no. WO 94/17213; these processes may be employed in the method of the present invention to carry out both the first and the second fractionation.

By moving the resin bed in a column into which the feed solution is introduced counter-currently to the liquid flow direction of the dry solids profile, an actual moving bed system can be achieved. It is self-evident that results very similar to those achieved with a simulated moving bea can be obtained with such an actual moving bed.

In the method of the invention, preferably a gel-type strong cation exchanger (e.g., "Dowex", "Finex" or "Purolite") is employed as the packing material for the columns, and it is preferably in sodium and/or potassium form. The packing material is preferably equilibrated to the tonic form of the feed solution prior to the fractionation.

The dry solids content of the beet-derived sucrose-containing solution to be fed to the chromatographic separation is typically 20–80 g/100 g, preferably 40–70 g/100 g. The solution is heated to 40–95° C., preferably 65–85° C., prior to being supplied to the separation process.

The elution phase employs mainly water and/or very dilute aqueous solutions (having a dry solids content less than 8% by weight, preferably less than 1% by weight). The eluant has a temperature of 40–95° C., preferably 65–85° C.

The dry solids content of the betaine fraction obtained from the first fractionation is adjusted prior to the second fractionation to about 20–50 g/100 g for batch separation or, typically, to 20–80 g/100 g, and preferably 40–70 g/100 g, for SMB separation.

Sucrose can be recovered from the sucrose fraction by methods commonly used in the sugar industry, such as by crystallization or as a syrup, or as liquid sugar subsequent to purification. Betaine is recovered from the second betaine fraction by crystallization, for example, as described in U.S. Pat. No. 4,359,430.

To optimize the sucrose and betaine yields and purity, the pH of the feed solution also may be adjusted. It is generally adjusted prior to the second fractionation to the range 6.5–12, and preferably between 9.5–11.5.

The following examples illustrate the method of the invention in the context of fractionating beet molasses to recover sucrose and betaine. It is not intended that the invention be limited by this description of the preferred embodiments.

EXAMPLE 1

Sequential SMB Process; Separation of Sucrose and Betaine from Molasses Without Further Separation of Betaine Fraction (Reference Example)

A chromatographic apparatus as schematically shown in FIG. 1 was employed. The apparatus comprised three columns 1–3 connected in series, fluid conduits 4–7 connecting the columns, a molasses container 8, a water/eluant container 9, a molasses feed conduit 10, an eluant feed conduit 11, a recycle pump 12, a molasses feed pump 13, an eluant feed pump 14, heat exchangers 15–17, product fraction withdrawal conduits 6, 18–20, 48 and 49 and valves 21–47.

The columns were packed with a strong cation exchanger resin known in the trade as Finex CS 11 GC™, manufactured by Finex Oy. The resin had a polystyrene/divinylbenzene backbone and was activated with sulphonic acid groups; the mean bead size (in Na+ form) was about 0.38 mm. The resin had a DVB content of 5.50. Prior to the test, the resin was regenerated to sodium form; during the fractionation it was equilibrated by cations from the feed solution.

| Test conditions: | |
| --- | --- |
| Diameter of columns | 0.2 m |
| Total height of resin bed | 10.5 m |
| Temperature | 80° C. |

The feed solution was beet molasses wherefrom calcium was precipitated by adding sodium carbonate (pH about 9); the calcium carbonate precipitate was removed by filtration.

Fractionation was performed using the following seven-step sequence:

Step 1: Feed solution 10 was introduced (feeding phase) into column 1 through valve 22 at a flow rate of 80 l/hr., and a residue fraction was eluted from the downstream end of same column 2 through conduit 48. Simultaneously, eluant 11 was supplied (eluting phase) to column 2 through valve 26 at a flow rate of 25 l/hr., and a sucrose fraction was eluted from column 3 through conduit 6.

Step 2: The liquid in the columns was recycled (recycling phase) in the loop formed by all columns at a rate 120 l/hr.

Step 3: Eluant 11 was introduced into column 1 through valve 23 at a rate of 120 l/hr. and, simultaneously, a betaine fraction was eluted from column 3 through conduit 6.

Step 4: Eluant 11 was introduced (eluting phase) into column 1 through valve 23 at a flow rate of 12 l/hr., and a second residue fraction was eluted from the downstream end of column 2 through conduit 49. Simultaneously, eluant was supplied (eluting phase) to column 3 through valve 29 at a flow rate of 55 l/hr., and a second betaine fraction was eluted from the downstream end of the same column through conduit 6.

Step 5: Same as step 2.

Step 6: Eluant 11 was introduced into column 1 through valve 23 at a flow rate of 120 l/hr., and a third residue fraction was eluted from the downstream end of column 3 through conduit 6.

Step 7: Same as step 2.

After the sequence was carried out to completion, the process control program returned to step 1. By repeating this sequence five to seven times, the system was equilibrated. The method proceeded in a state of equilibrium, and the process of the separation process was monitored with a density meter, a meter for optical activity, a conductivity meter, and the separation was controlled by a microprocessor whereby precisely defined volumes and flow rates of feeds, recycled liquid and product fractions were controlled employing quantity/volume measuring means, valves and pumps.

In this method, a sucrose fraction from column 3, two betaine fractions from column 3, and one residue fraction from each column were withdrawn. The betaine fractions were combined, as were the residue fractions.

Analyses of the feed solution and the product fractions withdrawn during one sequence after an equilibrium was reached are presented in Table 1, where the percentages of the different components are given as percent by weight dry solids basis.

TABLE 1

|  | Dry solids g/100 g | Sucrose % | Betaine % |
| --- | --- | --- | --- |
| Feed solution | 46.5 | 58.1 | 5.2 |
| Sucrose fraction | 25.8 | 92.1 | 0.8 |
| Betaine fraction (combined) | 4.2 | 18.1 | 55.6 |
| Residue fraction (combined) | 5.0 | 12.7 | 4.5 |

The sucrose yield into the sucrose fraction was 90.1% and the betaine yield into the combined betaine fraction 58.7%.

EXAMPLE 2

Sequential SMB Process; Separation of Sucrose and Betaine from Molasses, Further Separation of Betaine Fraction.

The apparatus and test conditions described in Example 1 were employed. The procedure was also similar to that of Example 1, except that the fraction volumes were adjusted. The adjustment caused a higher purity, but lower yield, for sucrose and a lower purity, but higher yield, for betaine than obtained in the first fractionation in Example 1. Subsequent to evaporation, the resulting betaine fraction was subjected to re-fractionation by a similar sequential SMB process. The sucrose fraction obtained from the second fractionation was combined with the sucrose fraction from the first fractionation, and the residue fractions were likewise combined.

Analyses of the feed solutions and the product fractions withdrawn during one sequence after an equilibrium was reached are presented in Table 2, where the percentages of the different components are given as percent by weight dry solids basis.

TABLE 2

|  | Dry solids g/100 g | Sucrose % | Betaine % |
| --- | --- | --- | --- |
| First fractionation |  |  |  |
| Feed solution | 46.5 | 58.1 | 5.2 |
| Sucrose fraction | 25.5 | 92.6 | 0.4 |
| Betaine fraction | 3.3 | 21.3 | 43.9 |
| Residue fraction | 4.8 | 11.7 | 0.9 |
| Second fractionation |  |  |  |
| Feed solution | 55.0 | 21.3 | 43.9 |
| Sucrose fraction | 14.0 | 82.6 | 1.0 |
| Betaine fraction | 8.3 | 1.1 | 85.2 |
| Residue fraction | 4.1 | 11.2 | 2.2 |
| Combined product fractions |  |  |  |
| Sucrose fraction | 24.7 | 92.2 | 0.4 |
| Residue fraction | 4.7 | 11.7 | 1.0 |

The sucrose yield from the first fractionation was 89.4% and the betaine yield was 89.9%. The total sucrose yield, calculated from the combined sucrose fraction, was 92.6% and the total betaine yield, calculated from the betaine fraction obtained from the second fractionation, was 88.2% The second fractionation afforded remarkable improvement of the sucrose yield and betaine purity. In addition, the betaine yield improved significantly as compared with Example 1.

EXAMPLE 3

The method described in Example 2 was essentially followed, but the effect of the pH of the feed solution for the second fractionation (which solution had been obtained from the betaine fraction from the first fractionation) was studied, performing the second fractionation in such a way that (a) the pH of the feed solution was not adjusted, and, hence, the pH was 10.2, (b) the pH of the feed solution was adjusted with hydrochloric acid to 9.5, and (c) the pH of the feed solution was adjusted with NaOH to 11.2.

Analyses of the feed solution for the second fractionation (i.e. further separation of the betaine fraction) and the product fractions withdrawn during one sequence after an equilibrium was reached are presented in Table 3, where the percentages of the different components are given as percent by weight dry solids basis.

TABLE 3

|  | Dry solids g/100 g | Sucrose % | Betaine % |
| --- | --- | --- | --- |
| Feed solution (a) pH 10.2 | 43.0 | 32.5 | 24.8 |
| Sucrose fraction | 16.6 | 84.6 | 0.1 |
| Betaine fraction | 6.2 | 0.4 | 89.3 |
| (b) pH 9.5 |  |  |  |
| Sucrose fraction | 17.9 | 81.1 | 0.1 |
| Betaine fraction | 6.2 | 0.4 | 88.0 |
| (c) pH 11.2 |  |  |  |
| Sucrose fraction | 15.4 | 82.5 | 0.1 |
| Betaine fraction | 6.1 | 0.1 | 90.4 |

The yields from the second fractionation in the above cases (a), (b) and (c) were as follows:

(a) sucrose 57.3%, betaine 95.4%
(b) sucrose 59.6%, betaine 96.8%
(c) sucrose 51.9%, betaine 96.8%.

As will be seen from the results, the pH of the feed solution affects the purity and yield of sucrose and betaine. The pH may be adjusted in accordance with the economical optimum.

EXAMPLE 4

Continuous SMB Process; Separation of Sucrose and By-product Fraction from Molasses (Reference Example).

Figure 2:
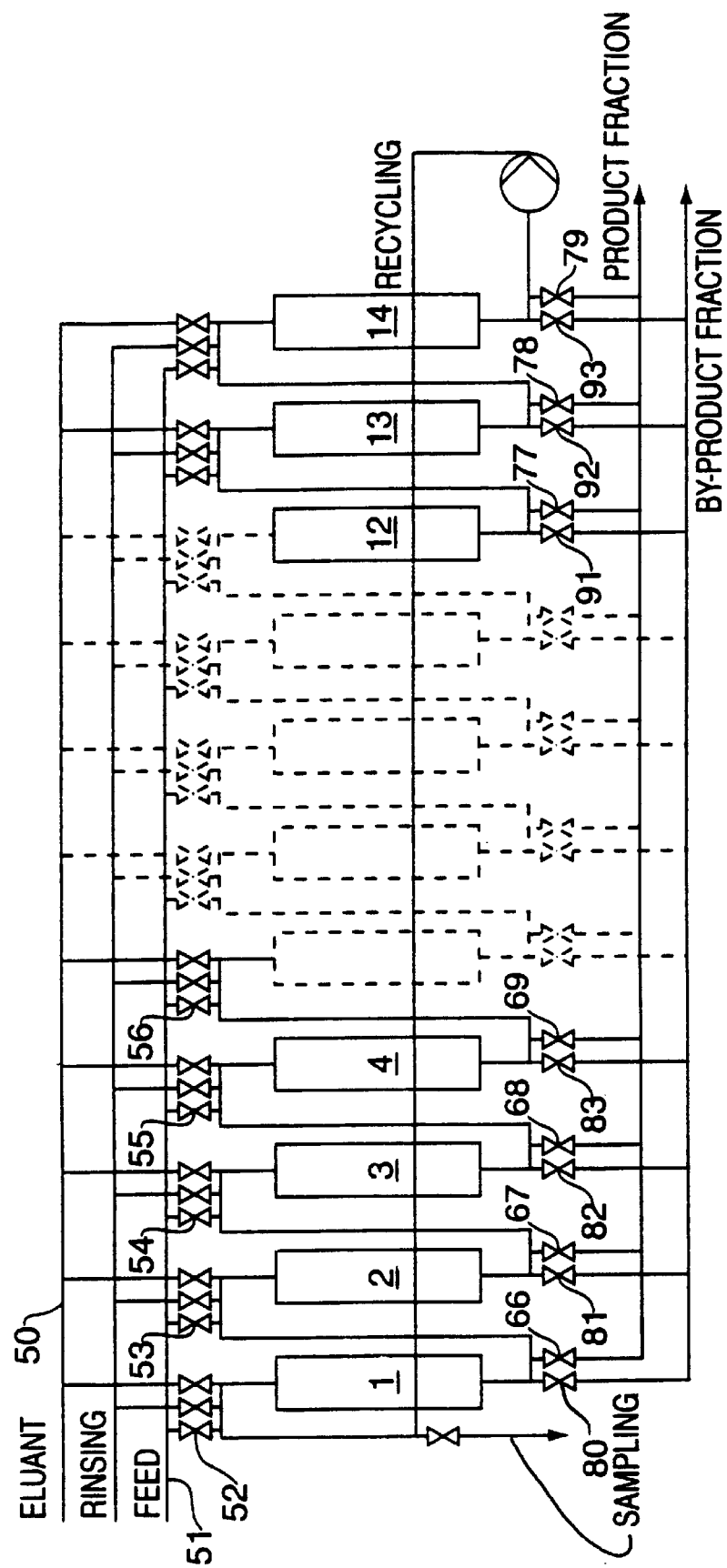
FIG. 2 is a truncated schematic diagram of a fourteen-column continuous SMB process as described in Example 4.

The test apparatus comprised 14 columns connected in series, each having a diameter of 0.2 m and each containing a packed bed having a height of 0.85 m. FIG. 2 shows a schematic diagram of the test apparatus.

The columns were packed with a polystyrene-based cross-linked (5.5% DVB) strong cation exchanger having a mean bead size of 0.32 mm. The packing material was equilibrated with feed solution and was predominantly in potassium and sodium form.

Water, as eluant, was introduced into the column system through conduit 50 at a flow rate of 83.5 l/hr. Feed solution was introduced through conduit 51 to each column through feed valves 52–65 at a flow rate of 13.5 l/hr. for 150 seconds. The feed conduits were rinsed with eluant (30 s, 13.5 l/hr.) subsequent to the introduction of the feed solution. The flow rate of the product fraction through valves 66–79 was adjusted to 21 l/hr., which produced a by-product flow rate of 76 l/hr. The by-product fraction was withdrawn through spring-biased valves 80–93 securing the desired pressure for the system. An average recycle rate of 300 l/hr. was maintained. In practice, this rate varies according to the change of the relative positions of the feed and product valves along the recirculation loop. The points of introduction of the feed solution and eluant and the withdrawal points of the product fractions were shifted downstream one column each successive step at intervals of 180 seconds.

Initially, the system was filled with a higher feed flow rate and lower eluant flow rate. Once the system was filled, the flow rate setpoints stated above were used to run the system until an equilibrium had been established.

Figure 3:
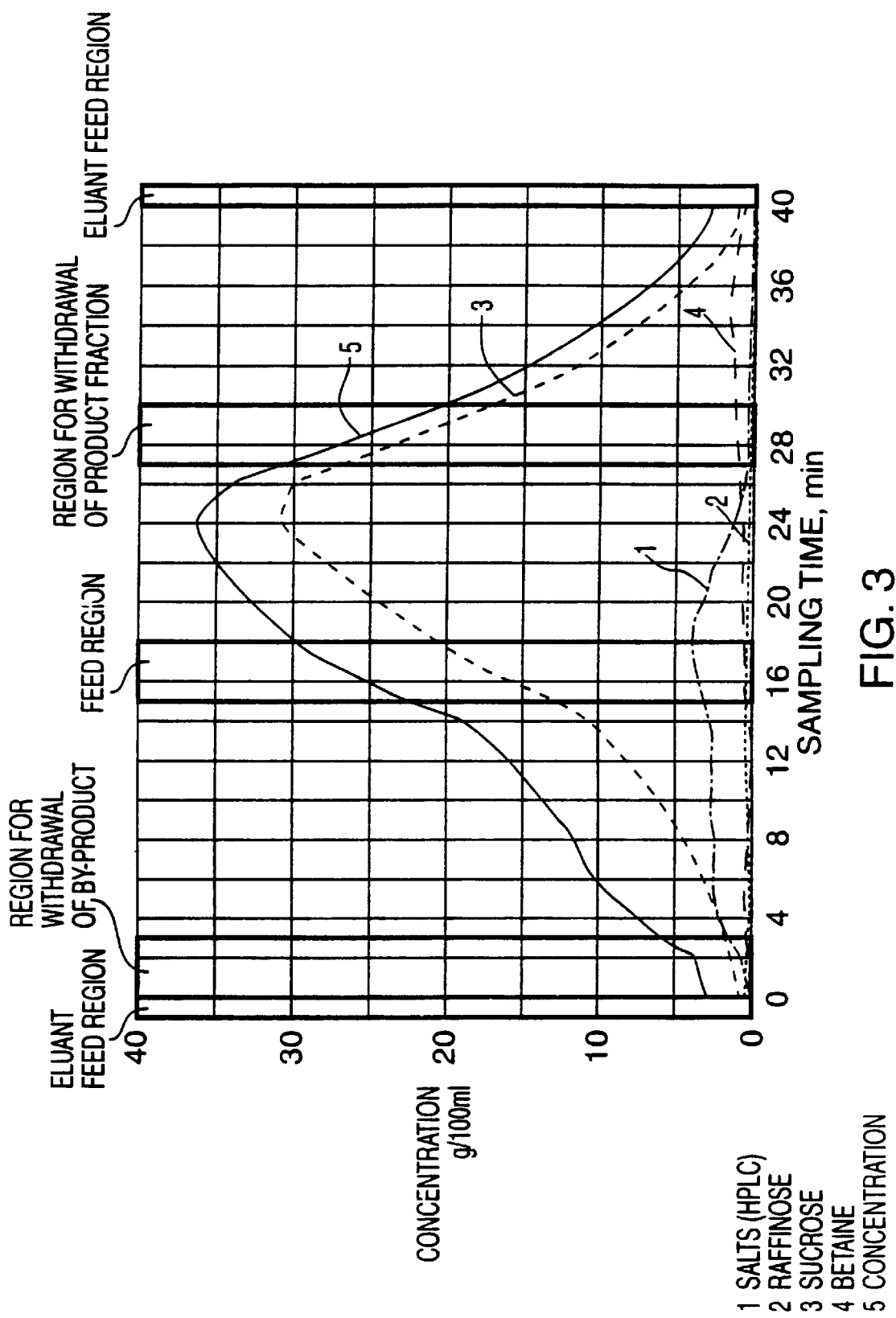
FIG. 3 is a graph of the concentration gradient of the liquid circulating in the fourteen-column system shown in FIG. 2 over time.

Samples were taken at two-minute intervals via a sampling valve placed in the recirculation loop. The concentration gradient shown in FIG. 3 was drawn on the basis of an analysis of the samples. In addition, the feed solution and the product and by-product fractions were analyzed. The results are shown in Table 4, where the percentages of the different components are given as percent by weight on a dry solids basis.

TABLE 4

|  | Feed Solution | Product fraction | By-product fraction |
| --- | --- | --- | --- |
| Dry solids content, g/100 g | 65.0 | 25.3 | 4.9 |

TABLE 4-continued

|  | Feed Solution | Product fraction | By-product fraction |
| --- | --- | --- | --- |
| Sucrose, % | 60.4 | 87.2 | 19.0 |
| Betaine, % | 5.5 | 4.5 | 7.0 |
| Raffinose, % | 2.1 | 0.9 | 4.0 |
| Others, % | 32.0 | 7.4 | 70.0 |
| Flow rate, l/hr. | 13.5 | 21.0 | 76.0 |

Sucrose yield into sucrose fraction 87.6

EXAMPLE 5

Continuous SMB Process for Separation of Sucrose and Betaine From Molasses and Batch Method for Further Separation of Betaine Fraction.

Figure 4:
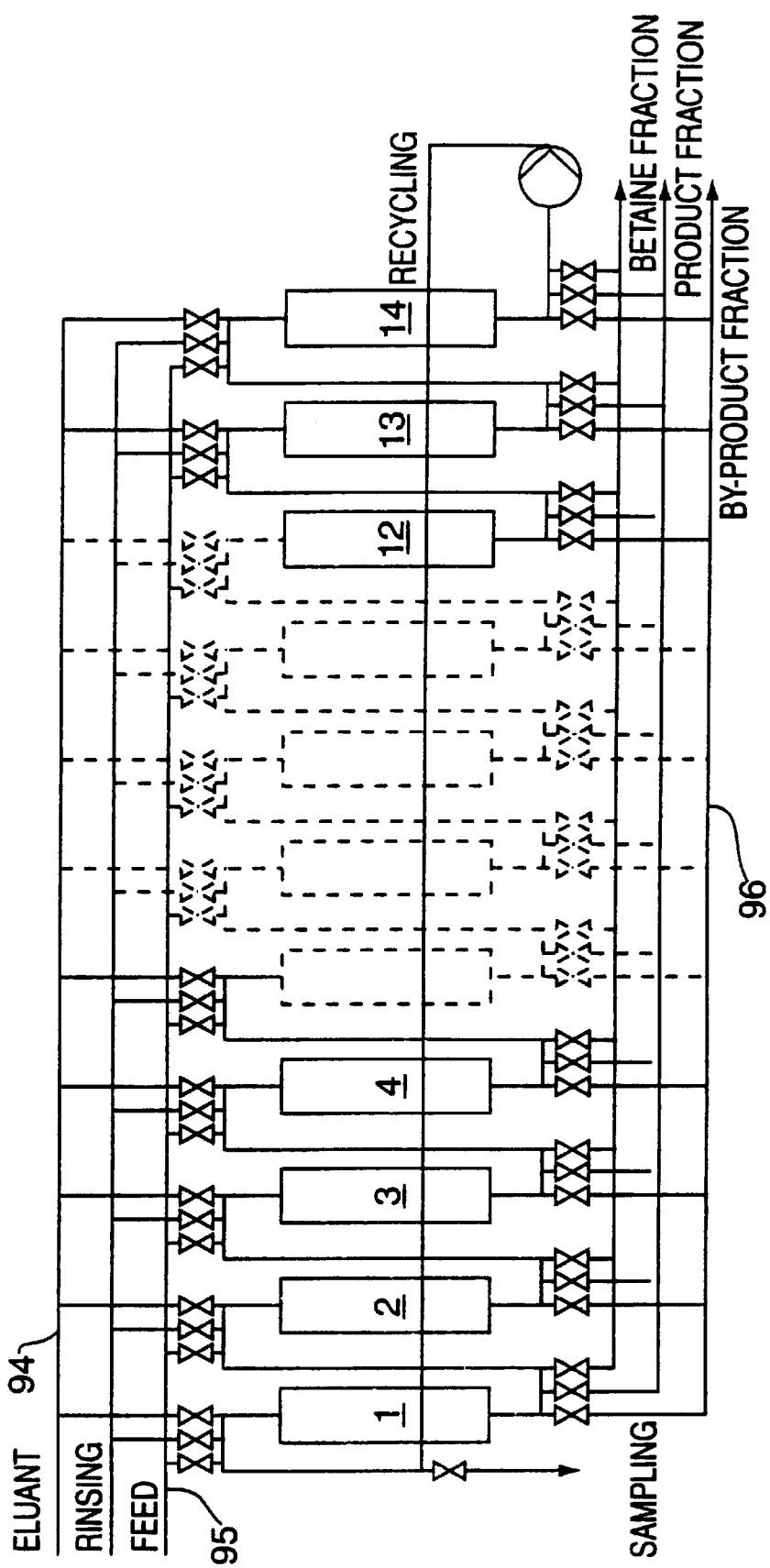
FIG. 4 is a truncated schematic diagram of a fourteen-column continuous SMB process as described in Example 5.

Molasses was fractionated by the continuous SMB method, wherein the fourteen-column system of Example 4 was modified in such a way that it was possible to withdraw three product fractions: sucrose, betaine, and by-product fractions. FIG. 4 shows a schematic diagram of the test apparatus. The flow rate of the sucrose fraction was adjusted to 21 l/hr. and the flow rate of the betaine fraction to 18 l/hr. The feed rate of the eluant through conduit 94 was 90.5 l/hr., and the feed flow rate through conduit 95 was 13.5 l/hr. Hence, the flow rate of the by-product fraction through conduit 96 was 65 l/hr.

The betaine fraction was concentrated to a dry solids content of 55% and fed to a separation system comprising two columns connected in series. The columns had a diameter of 0.2 m, and the packed bed in each column had a height of 0.85 m. The packing material was the same as in Example 4.

The betaine fraction was further fractionated using a batch process, supplying 2.6 liters of feed solution (55% by weight on a dry solids basis) to the upstream end of the first column. The feed was repeatedly introduced at intervals of 60 minutes. Elution was performed at a flow rate of 30 l/hr. The following fractions were withdrawn from the bottom of the column:

Fraction 1: By-product 8.6 liters

Fraction 2: Recycle fraction 2 liters (introduced into the column prior to the actual feed)

Fraction 3: Product solution 2.6 liters

Fraction 4: Recycle fraction 1.4 liters (introduced into the column subsequent to the actual feed)

Fraction 5: Betaine fraction 5.0 liters

Fraction 6: Elution recycling 10 liters

In the test example, the betaine separation had more capacity than the single SMB-column system with respect to betaine fraction produced.

Figure 5:
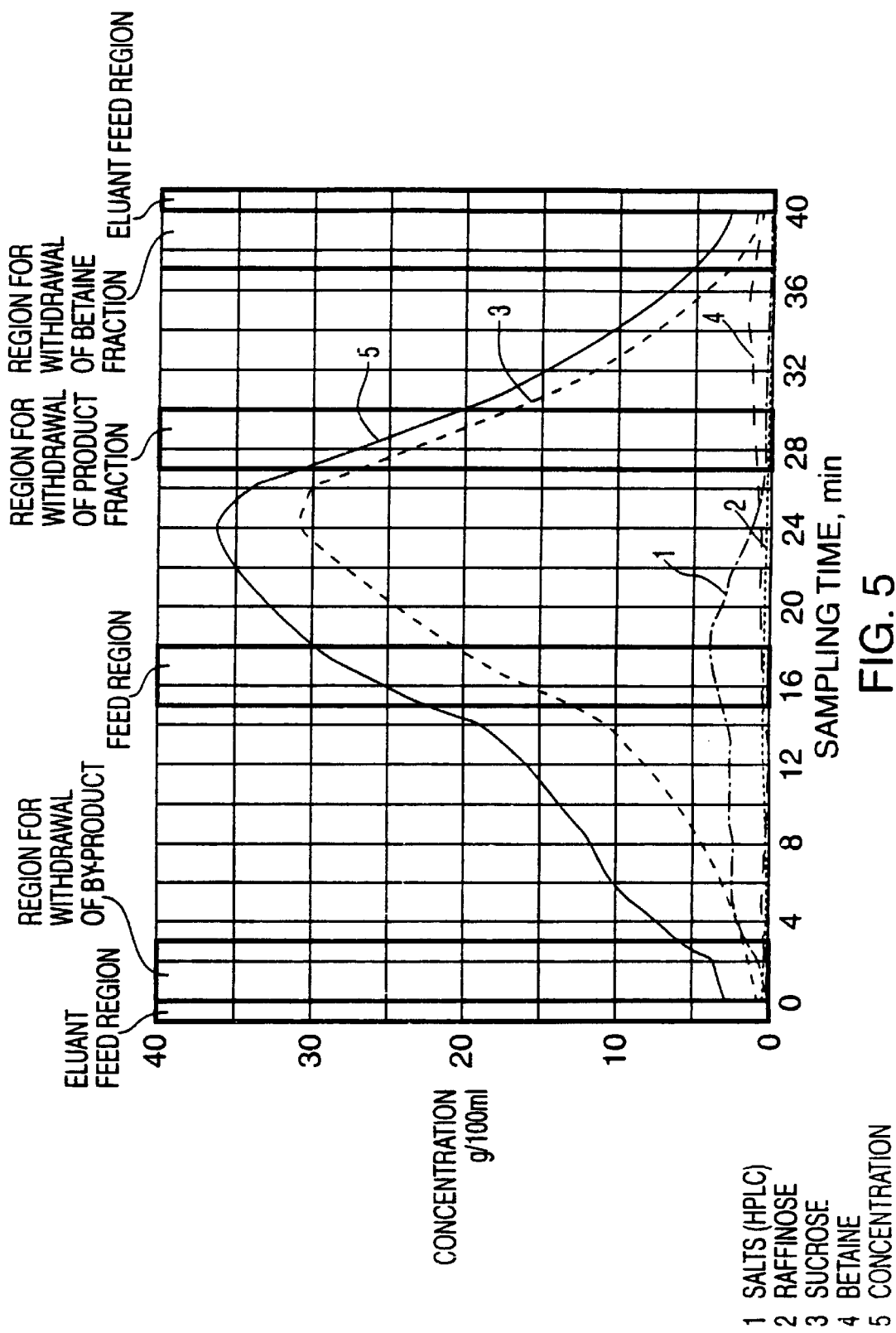
FIG. 5 is a graph of the concentration gradient of the liquid circulating in the fourteen-column system shown in FIG. 4 over time.

The filling and equilibration of the column system, sampling, and analyzing of the samples were performed as above. The concentration gradient from the first continuous SMB separation is shown in FIG. 5. The results are shown in Table 5, where the percentages of the different components are given as percent by weight on a dry solids basis.

TABLE 5

| | Dry solids content g/100 g | Sucrose % | Betaine % | Raffinose % | Others % | Flow rate l/hr. |
|---|---|---|---|---|---|---|
| Fraction of molasses, continuous SMB | | | | | | |
| Feed solution | 65.0 | 60.4 | 5.5 | 2.1 | 32.0 | 13.5 |
| Sucrose fraction I | 25.2 | 87.6 | 4.5 | 0.9 | 7.0 | 21.0 |
| Betaine fraction I | 3.5 | 45.2 | 31.1 | 0.4 | 23.3 | 18.0 |
| By-product fraction I | 4.9 | 13.7 | 2.3 | 4.6 | 79.4 | 65.0 |
| Sucrose yield into sucrose fraction 87.6% | | | | | | |
| Betaine yield into betaine fraction 37.0% | | | | | | |
| Fractionation of betaine fraction, batch method | | | | | | |
| Feed solution | 55.0 | 45.2 | 31.1 | 0.4 | 23.3 | |
| Sucrose fraction II | 22.8 | 92.6 | 2.2 | 0.2 | 5.0 | |
| Betaine fraction II | 10.3 | 5.4 | 88.3 | 0.0 | 6.3 | |
| By-product fraction II | 4.5 | 18.0 | 3.2 | 1.2 | 77.6 | |
| Sucrose yield into sucrose fraction 86.2% | | | | | | |
| Betaine yield into betaine fraction 94.5% | | | | | | |
| Combined sucrose and by-product fractions | | | | | | |
| Sucrose fraction I + II | 25.1 | 87.8 | 4.4 | 0.9 | 6.9 | |
| Betaine fraction II | 10.3 | 5.4 | 88.3 | 0.0 | 6.3 | |
| By-product fraction I + II | 4.8 | 13.9 | 2.3 | 4.5 | 79.3 | |
| Sucrose yield into sucrose fraction 91.8% | | | | | | |
| Betaine yield into betaine fraction 35.0% | | | | | | |

As can be seen from the results, the yield of sucrose increased from 87.6% to 91.8% and the purity of sucrose increased from 87.2% to 87.8%. With this modification, betaine was recovered with a yield of about 35% and a purity of 88.3% The low betaine yield is a result of the continuous SMB method in which the feed flow was uninterrupted, and thus a considerable portion of the betaine was lost in the sucrose fraction. By increasing the eluant flow rate and increasing the flow rate of the betaine fraction proportionately, the betaine yield is predicted to increase up to about 50–60%.

EXAMPLE 6

Sequential SMB Method for Separation of Sucrose and Betaine From Molasses and Further Separation of Betaine Fraction.

Figure 6:
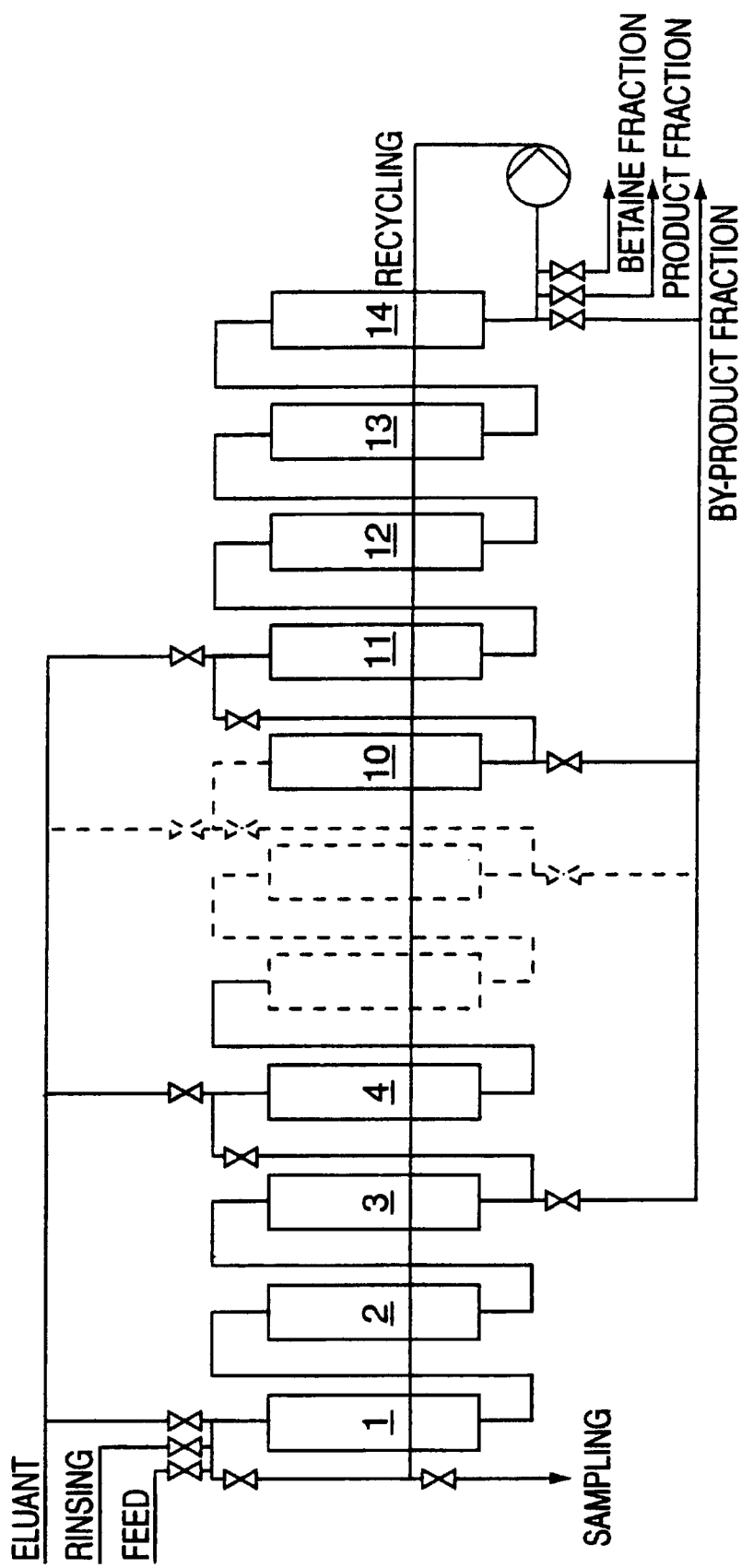
FIG. 6 is a truncated schematic diagram of a fourteen-column continuous SMB process for separating sucrose and betaine from molasses as described in Example 6.

The continuous SMB process disclosed in Example 4 was converted into a sequential method in such a way that the columns of Example 4, referred to as sectional packed beds herein, were interconnected in sequence to form a four-column system in which two columns were formed by sectional packed beds 1–3 and 4–6, and two columns by sectional packed beds 7–10 and 11–14. Thus, the system comprised two columns having a total sectional packed bed height of 2.55 m each, and two columns having a total sectional packed bed height of 3.4 m each. FIG. 6 shows a schematic diagram of the apparatus.

Fractionation was performed sequentially by the following eight-step sequence:

Step 1: 15 liters of feed solution was introduced into sectional packed bed 1 at a flow rate of 75 l/hr., and a by-product fraction was withdrawn from sectional packed bed 10. 20 liters of eluant was introduced into sectional packed bed 11 at a flow rate of 100 1/hr., and a sucrose fraction was withdrawn from sectional packed bed 14.

Step 2: 8 liters of liquid was recycled at a flow rate of 100 l/hr. in the loop formed by all columns.

Step 3: 12 liters of eluant was introduced into sectional packed bed 1 at a flow rate of 120 l/hr. and a by-product fraction was withdrawn from column sectional packed bed 3. Simultaneously, 12 liters of eluant was supplied to sectional packed bed 4 at a flow rate of 120 l/hr., and a betaine fraction was withdrawn from sectional packed bed 14.

Step 4: 14 liters of eluant was introduced into sectional packed bed 1 at a flow rate of 120 l/hr., and a betaine fraction was withdrawn from sectional packed bed 14.

Step 5: 8 liters was recycled at a flow rate of 100 l/hr. in the loop formed by all columns.

Step 6: 10 liters of eluant was introduced into sectional packed bed 1 at a flow rate of 100 l/hr., and a by-product fraction was withdrawn from sectional packed bed 14.

Step 7: 4 liters of eluant was introduced into sectional packed bed 1 at a flow rate of 120 l/hr., and a by-product fraction was withdrawn from sectional packing material bed 14.

Step 8: 12 liters of eluant was introduced into sectional packed bed 7. The profile was shifted by way of recirculation to sectional packed bed 1, and a by-product fraction was withdrawn from sectional packed bed 6.

Figure 7:
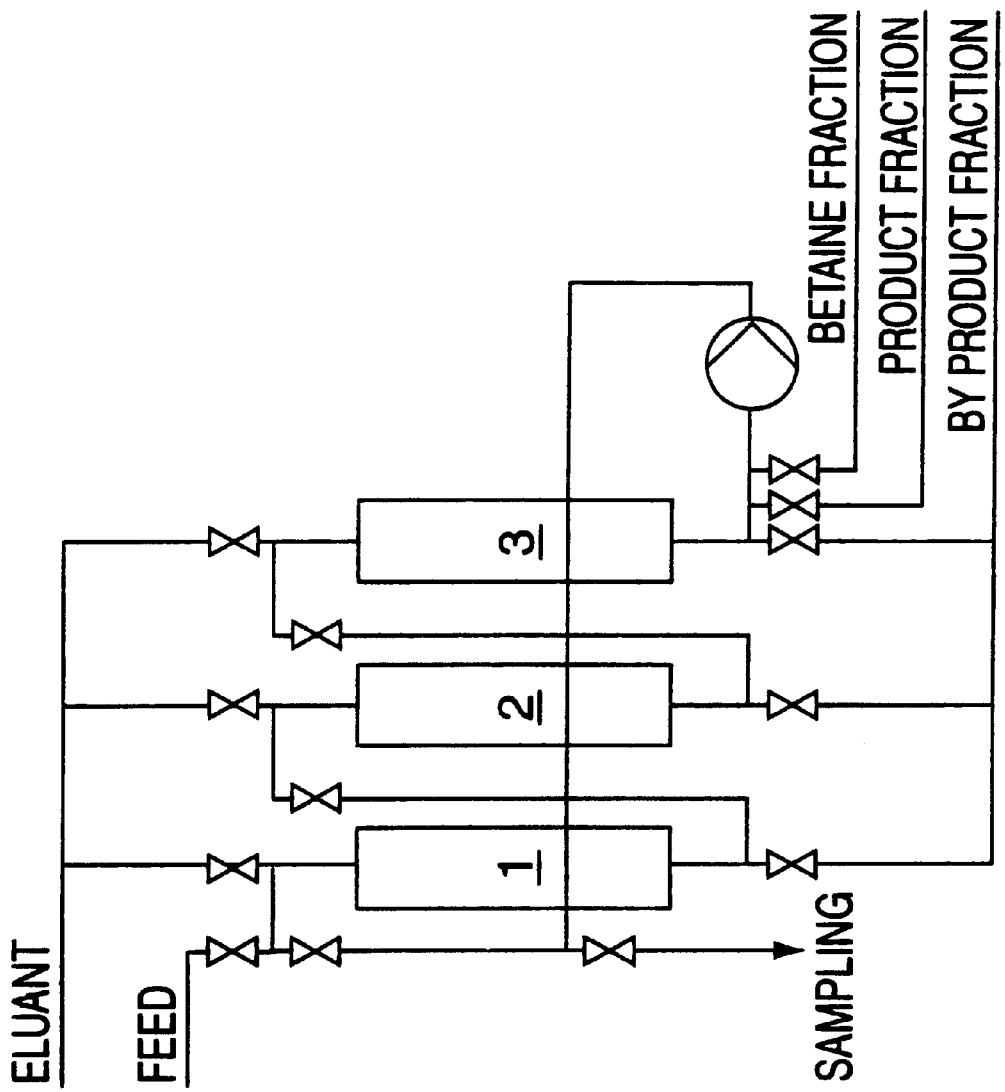
FIG. 7 is a schematic diagram of a three-column sequential SMB process for the second fractionation of betaine as described in Example 6.

The betaine fraction was concentrated to a dry solids content of 55% and introduced into a separation system comprising three columns. FIG. 7 shows a schematic diagram of the apparatus. The columns had a diameter of 0.2 m, and the packed bed in each column had a height of 0.85 m. The packing material was the same as in Example 4.

Fractionation was performed sequentially by the following eight-step sequence:

Step 1: 2 liters of feed solution was introduced into column 1 at a flow rate of 60 l/hr., and a by-product fraction was withdrawn from column 2. 2.7 liters of eluant was supplied to column 3 at a flow rate of 80 l/hr., and sucrose fraction was withdrawn from column 3.

Step 2: 1.5 liters of feed solution was supplied to column 1 at a flow rate of 60 l/hr., and a sucrose fraction was withdrawn from column 3.

Step 3: 1.5 liters was recycled at a flow rate of 60 l/hr. in the loop formed by all columns.

Step 4: 3 liters of eluant was introduced into column 1 at a flow rate of 60 l/hr., and a betaine fraction was withdrawn from column 3.

Step 5: 1.8 liters of eluant was introduced into column 1 at a flow rate of 54 l/hr., and a by-product fraction was withdrawn from column 1. Simultaneously, 4 liters of eluant was supplied to column 2 at a flow rate of 120 l/hr., and a betaine fraction was withdrawn from column 3.

Step 6: 3 liters was recycled at a flow rate 60 l/hr. in the loop formed by all columns.

Step 7: 1.5 liters of eluant was introduced into column 1 at a flow rate of 60 l/hr., and a by-product fraction was withdrawn from column 3.

Step 8: 3 liters was recycled at a flow rate of 60 l/hr. in the loop formed by all columns.

With this procedure, the betaine separation has double the capacity of the first separation stage with respect to the amount of the betaine fraction produced. Thus, it was not attempted in this test to optimize the sequence with respect to capacity and energy consumption, but good yields and purities were pursued. This resulted in low fraction concentrations. It is obvious to those skilled in the art that, on an industrial scale, optimization is realized on an economic basis, thus the optimum values may vary from the values disclosed herein.

Figure 8:
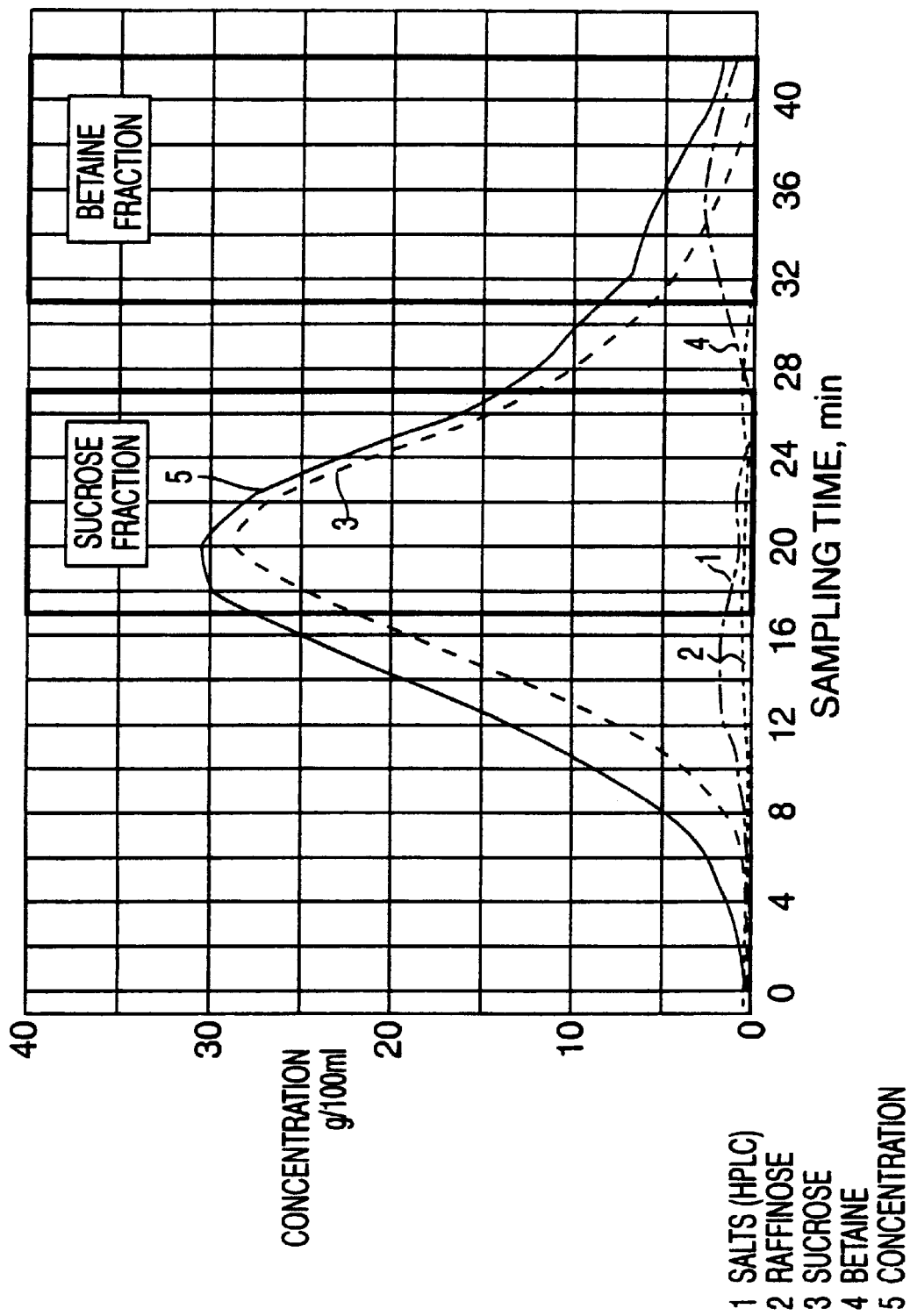
FIG. 8 is a graph of the concentration gradient of the liquid circulating in the fourteen-column system shown in FIG. 6 over time.

The filling and equilibration of the column system, sampling, and analyses of the samples were performed similarly as in Example 4. The concentration gradient from the output of sectional packed bed 14 in the first continuous SMB separation is shown in FIG. 8. The results are shown in Table 6, where the percentages of the different components are given as percent by weight on a dry solids basis.

TABLE 6

|  | Dry solids content g/100 g | Sucrose % | Betaine % | Raffinose % | Others % |
|---|---|---|---|---|---|
| Fraction of molasses, sequential SMB |  |  |  |  |  |
| Feed solution | 55.0 | 60.4 | 5.5 | 2.1 | 32.0 |
| Sucrose fraction I | 24.3 | 92.3 | 0.9 | 1.2 | 5.6 |
| Betaine fraction I | 3.9 | 44.9 | 45.5 | 0.7 | 8.9 |
| By-product fraction I | 5.9 | 14.1 | 0.6 | 4.0 | 81.3 |
| Sucrose yield into sucrose fraction 84.1% |  |  |  |  |  |
| Betaine yield into betaine fraction 87.3% |  |  |  |  |  |
| Fractionation of betaine fraction, sequential SMB |  |  |  |  |  |
| Feed solution | 55.0 | 44.9 | 45.5 | 0.7 | 8.9 |
| Sucrose fraction II | 22.5 | 91.7 | 5.3 | 0.5 | 2.5 |
| Betaine fraction II | 16.0 | 7.4 | 88.9 | 0.0 | 3.7 |
| By-product fraction II | 3.0 | 25.3 | 1.0 | 5.5 | 68.2 |
| Sucrose yield into sucrose fraction 87.0% |  |  |  |  |  |
| Betaine yield into betaine fraction 94.8% |  |  |  |  |  |
| Combined sucrose and by-product fractions |  |  |  |  |  |
| Sucrose fraction I + II | 24.2 | 92.3 | 1.2 | 1.1 | 5.4 |
| Betaine fraction II | 16.0 | 7.4 | 88.9 | 0.0 | 3.7 |
| By-product fraction I + II | 5.7 | 14.4 | 0.6 | 4.0 | 81.0 |
| Sucrose yield into sucrose fraction 91.0% |  |  |  |  |  |
| Betaine yield into betaine fraction 82.8% |  |  |  |  |  |

As can be seen from FIG. 8, significantly better separation of betaine from sucrose is achieved compared to the fully continuous method of Example 5. Table 6 shows that with substantially similar column loads, the sequential method also yields a considerably higher purity of 92.3%, for the sucrose fraction than the 87.2–87.8% for the fully continuous method. Double separation permits the first fractionation to be performed with a relatively low sucrose yield, e.g., 84.1%, thus realizing the need for a high separation capacity and low evaporation. Double separation increases the sucrose yield to 91.0%. The betaine yield may easily be increased to 82.8%, and with a higher eluant quantity and column capacity, the betaine yield may exceed 90%.

We claim:

1. A method for producing fractions comprising sucrose and a dissolved component from a beet-derived sucrose-containing material, comprising the steps of:

fractionating a beet-derived sucrose-containing material in a first loop by a chromatographic simulated moving bed process to produce at least a first fraction and a second fraction, said second fraction comprising sucrose and a dissolved component selected from the group consisting of betaine, inositol, raffinose, galactinol, serine and amino acid;

fractionating a stream comprising said second fraction in a second loop by chromatographic fractionation to produce at least a third fraction and a fourth fraction, said third fraction comprising sucrose, said fourth fraction comprising sucrose and said dissolved component, said third fraction comprising a higher percentage concentration by weight sucrose on a dry substance basis than said second and fourth fractions, said fourth fraction comprising a higher percentage concentration by weight on a dry substance basis of said dissolved component than said second fraction, and said second loop being different than said first loop; and wherein said second fraction is concentrated prior to being fractionated in said second loop.

2. The method of claim 1 wherein said first fraction is selected from the group consisting of a sucrose fraction, a by-product fraction and a residue fraction.

3. The method of claim 1 wherein the second fraction is combined with the first fraction to produce said stream comprising said second fraction in said second loop.

4. The method of claim 1 wherein said first fraction comprises the highest percentage by weight of raffinose on a dry substance basis.

5. The method of claim 1 wherein said first fraction comprises the highest percentage by weight of betaine on a dry substance basis.

6. The method of claim 5 wherein said second fraction comprises at least about 30% to about 45% by weight betaine and said fourth fraction comprises at least about 85% to about 90% by weight betaine.

7. The method of claim 1 wherein the simulated moving bed process in said first loop is selected from the group consisting of a continuous simulated moving bed process and a sequential simulated moving bed process.

8. The method of claim 1 wherein the chromatographic fractionation in said second loop comprises a batch method.

9. The method of claim 1 wherein the chromatographic fractionation in said second loop is selected from the group consisting of a continuous simulated moving bed process and a sequential simulated moving bed process.

10. The method of claim 1 wherein each loop comprises a series of columns.

11. The method of claim 1 wherein the fractionation in said first and second loops is performed with a cation exchanger and each of said loops comprise a separate fractionator.

12. The method of claim 1 wherein the dry solids content of the stream fed to the second loop for fractionation is adjusted to the range of about 20–80 g/100 g.

13. The method of claim 1 wherein the pH of the stream fed to the second loop for fractionation is adjusted to the range of about 6.5–12.

14. The method of claim 1 wherein said dissolved component is betaine.

15. The method of claim 1 wherein said dissolved component is raffinose.

16. The method of claim 1 wherein:
said second fraction is enriched with said dissolved component;
said third fraction is enriched with sucrose; and
said fourth fraction is enriched with said dissolved component.

17. The method of 1 including adjusting volumes of said first fraction and said second fraction.

18. The method of claim 1 wherein said second fraction has a dry solids content which is adjusted prior to fractionating said stream in said second loop.

19. The method of claim 1 wherein said second fraction is subject to evaporation prior to being fractionated in said second loop.

20. A method for processing a beet-derived sucrose-containing material, comprising the steps of:
fractionating a beet-derived sucrose-containing material comprising a dissolved component in a first loop comprising a first fractionator into at least two fractions, the first of said fractions comprising a greater percentage of said dissolved component on a dry substance basis than any other fraction from said first fractionator, and said dissolved component selected from the group consisting of betaine, inositol, raffinose, galactinol, serine, and amino acid;
fractionating a stream comprising said first fraction in a second loop comprising a second fractionator into a fraction comprising sucrose and another fraction comprising a greater percentage of said dissolved component on a dry substance basis than said first fraction; and
said fractionators comprising a series of columns, beds, or parts thereof, said second fractionator having at least one column, bed, or part thereof, separate and distinct from said first fractionator;
said fractionating in said first fractionator selected from the group consisting of a continuous chromatographic simulated moving bed process and a sequential chromatographic moving bed process;
said fractionating in said second fractionator selected from the group consisting of a batch separation process, a continuous simulated chromatographic moving bed process, and a sequential simulated chromatographic moving bed process; and wherein said second fraction is concentrated prior to being fractionated in said second loop.

21. The method of claim 20, wherein said beet-derived sucrose containing material comprises molasses.

22. The method of claim 20 wherein said dissolved component is betaine.

23. The method of claim 20 wherein said dissolved component is raffinose.

24. A method for producing fractions comprising sucrose and a dissolved component from a beet-derived sucrose-containing solution, comprising the steps of:
fractionating a beet-derived sucrose-containing solution in a first loop by a chromatographic simulated moving bed process to produce at least a first fraction and a second fraction, said second fraction comprising sucrose and a dissolved component selected from the group consisting of betaine, inositol, raffinose, galactinol, serine and amino acid;
fractionating a stream comprising said second fraction in a second loop by chromatographic fractionation to produce at least a third fraction and a fourth fraction, said third fraction comprising sucrose, said fourth fraction comprising sucrose and said dissolved component, said third fraction comprising a higher percentage concentration by weight sucrose on a dry substance basis than said second and fourth fractions, said fourth fraction comprising a higher percentage concentration by weight on a dry substance basis of said dissolved component than said second fraction, and said second loop being different than said first loop; and
wherein at least part of one of said fractions is recycled to said beet-derived sucrose-containing solution for fractionating in said first loop.

25. The method of claim 24 wherein said dissolved component is raffinose.

26. The method of claim 24 wherein said first fraction is selected from the group consisting of a sucrose fraction, a by-product fraction and a residue fraction.

27. The method of claim 24 wherein the second fraction is combined with the first fraction to produce said stream comprising said second fraction in said second loop.

28. The method of claim 24 wherein said first fraction comprises the highest percentage by weight of raffinose on a dry substance basis.

29. The method of claim 24 wherein said first fraction comprises the highest percentage by weight of betaine on a dry substance basis.

30. The method of claim 29 wherein said second fraction comprises at least about 30% to about 45% by weight betaine and said fourth fraction comprises at least about 85% to about 90% by weight betaine.

31. The method of claim 24 wherein the simulated moving bed process in said first loop is selected from the group consisting of a continuous simulated moving bed process and a sequential simulated moving bed process.

32. The method of claim 24 wherein the chromatographic fractionation in said second loop comprises a batch method.

33. The method of claim 24 wherein the chromatographic fractionation in said second loop is selected from the group consisting of a continuous simulated moving bed process and a sequential simulated moving bed process.

34. The method of claim 24 wherein each loop comprises a series of columns.

35. The method of claim 24 wherein the fractionation in said first and second loops is performed with a cation exchanger and each of said loops comprises a separate fractionator.

36. The method of claim 24 wherein the dry solids content of the stream fed to the second loop for fractionation is adjusted to the range of about 20–80 g/100 g.

37. The method of claim 24 wherein the pH of the stream fed to the second loop for fractionation is adjusted to the range of about 6.5–12.

38. The method of claim 24 wherein said dissolved component is betaine.

39. The method of claim 24 wherein said dissolved component is raffinose.

40. The method of claim 24 wherein:
said second fraction is enriched with said dissolved component;
said third fraction is enriched with sucrose; and said fourth fraction is enriched with said dissolved component.

41. The method of 24 including adjusting volumes of said first fraction and said second fraction.

42. The method of claim 24 wherein said second fraction has a dry solids content which is adjusted prior to fractionating said stream in said second loop.

43. The method of claim 24 wherein said second fraction is concentrated prior to being fractionated in said second loop.

44. A method for processing a beet-derived sucrose-containing solution, comprising the steps of:

fractionating a beet-derived sucrose-containing solution comprising a dissolved component in a first loop comprising a first fractionator into at least two fractions, the first of said fractions comprising a greater percentage of said dissolved component on a dry substance basis than any other fraction from said first fractionator, and said dissolved component selected from the group consisting of betaine, inositol, raffinose, galactinol, serine, and amino acid;

fractionating a stream comprising said first fraction in a second loop comprising a second fractionator into a fraction comprising sucrose and another fraction comprising a greater percentage of said dissolved component on a dry substance basis than said first fraction;

said fractionator comprising a series of columns, beds, or parts thereof, said second fractionator having at least one column, bed, or parts thereof, separate and distinct from said first fractionator;

said fractionating in said first fractionator selected from the group consisting of a continuous chromatographic simulated moving bed process and a sequential chromatographic moving bed process;

said fractionating in said second fractionator selected from the group consisting of a batch separation process, a continuous simulated chromatographic moving bed process, and a sequential simulated chromatographic moving bed process; and wherein at least part of one of said fractions is recycled to said beet-derived sucrose- containing solution for fractionating in said first loop.

45. The method of claim 44 wherein said beet-derived sucrose containing solution comprises molasses.

46. The method of claim 44 wherein said dissolved component is betaine.

47. The method of claim 44 wherein said dissolved component is raffinose.

* * * * *